United States Patent
Xia et al.

(10) Patent No.: US 11,255,184 B1
(45) Date of Patent: Feb. 22, 2022

(54) DETERMINING A SUBTERRANEAN FORMATION BREAKDOWN PRESSURE

(71) Applicant: Saudi Arabian Oil Company, Dhahran (SA)

(72) Inventors: Kaiming Xia, Dhahran (SA); Yufeng Cui, Beijing (CN)

(73) Assignee: Saudi Arabian Oil Company

( * ) Notice: Subject to any disclaimer, the term of this patent is extended or adjusted under 35 U.S.C. 154(b) by 0 days.

(21) Appl. No.: 17/075,342

(22) Filed: Oct. 20, 2020

(51) Int. Cl.
*E21B 47/06* (2012.01)
*E21B 49/00* (2006.01)

(52) U.S. Cl.
CPC ............ *E21B 47/06* (2013.01); *E21B 49/006* (2013.01)

(58) Field of Classification Search
CPC ....... E21B 47/06; E21B 49/006; E21B 49/005
See application file for complete search history.

(56) References Cited

U.S. PATENT DOCUMENTS

| | | | |
|---|---|---|---|
| 6,724,687 B1 | 4/2004 | Stephenson et al. | |
| 7,073,578 B2* | 7/2006 | Vinegar | E21B 36/008 166/245 |
| 7,121,342 B2* | 10/2006 | Vinegar | E21B 36/02 166/302 |
| 7,360,588 B2* | 4/2008 | Vinegar | E21B 43/24 166/59 |
| 7,890,307 B2 | 2/2011 | Geehan et al. | |
| 7,942,203 B2* | 5/2011 | Vinegar | E21B 47/00 166/252.1 |
| 8,579,031 B2* | 11/2013 | Vinegar | E21B 36/02 166/302 |

(Continued)

FOREIGN PATENT DOCUMENTS

| | | |
|---|---|---|
| AU | 2013206713 | 7/2013 |
| CA | 2884071 | 3/2014 |
| CN | 104459775 | 2/2017 |

(Continued)

OTHER PUBLICATIONS

U.S. Appl. No. 17/140,252, filed Jan. 4, 2021, Xia et al.

(Continued)

*Primary Examiner* — Shane Bomar
(74) *Attorney, Agent, or Firm* — Fish & Richardson P.C.

(57) ABSTRACT

Techniques for determining a breakdown pressure of a subterranean formation include identifying in-situ stresses for a portion of a wellbore formed into a subterranean formation; transforming the in-situ stresses (and induced stresses) from a global coordinate system to a wellbore coordinate system of a deviated portion of the wellbore that includes at least one perforation tunnel for a hydraulic fracturing treatment; transforming the in-situ stresses from the wellbore coordinate system to a perforation coordinate system through at least one rotation matrix; determining one or more stresses at a wellbore-perforation interface of the perforation tunnel from the in-situ stresses in the perforation coordinate system; calculating one or more hoop stresses at a perforation tunnel wall of the perforation tunnel from the determined stresses on the wellbore-perforation interface; and determining a breakdown pressure for the subterranean formation based on the calculated one or more hoop stresses and an effect of casing-cement-formation interaction.

27 Claims, 12 Drawing Sheets

(56) References Cited

U.S. PATENT DOCUMENTS

2016/0045841 A1* 2/2016 Kaplan .............. B01D 53/48
429/49
2018/0293789 A1 10/2018 Shen et al.

FOREIGN PATENT DOCUMENTS

| CN | 109711595 | 5/2019 |
| KR | 101620506 | 5/2016 |
| WO | 2016100762 | 6/2016 |

OTHER PUBLICATIONS

U.S. Appl. No. 17/168,734, filed Feb. 5, 2021, Xia et al.
Abaqus, "Concreate Damaged Plasticity" Abaqus Online Manual, 2019, 14 pages.
Alekseenko et al., "3-D modeling of fracture initiation from perforated non-cemented wellbore" SPE 151585. The Proceeding of The SPE Hydraulic Fracturing Technology Conference held in The Woodlands, Texas, USA, Feb. 2012, 12 pages.
Kurdi et al., "A New Computational Model to Predict Breakdown Pressures in Cased and Perforated Wells in Unconventional Reservoirs" ASEG Extended Abstracts, 2018, 10 pages.
Lubliner, "A Plastic-Damage Model for Concrete" International Journal of Solids and Structures, vol. 25, No. 3, 1989, 28 pages.
Michael, "Orientation of hydraulic fracture initiation from perforated horizontal wellbore" SPE-199766-STU. The SPE Annual Technical Conference and Exhibition held in Calgary, Canada, Oct. 2019, 23 pages.
El-Rabaa et al., "New perforation pressure loss correlations for limited entry fracturing treatments" SPR-38373, The Proceedings of the SPE Rocky Mountain Regional Meeting. Casper, Wyoming, May 18-21, 1997, 9 pages.
Haimson et al., "Initiation and extension of hydraulic fractures in rock" Society of Petroleum Engineers. V.7, 1967, 310-318, 9 pages.
Hossain et al., "Hydraulic fracture initiation and propagation: roles of wellbore trajectory" Perforation and stress reginme. J. Pet. Sci. & Eng. vol. 27, 2000, 129-149, 21 pages.
Hubbert et al., "Mechanics of hydraulic fracturing" Petroleum Transaction, AIME. V.210, 1957, 153-168, 16 pages.
Shi et al., "An analytical solution to stress state of casing-cement sheath-formation system with the consideration of its initial loaded state and wellbore temperature variation." International Journal of Emerging Technology and Advanced Engineering 5.1, 2015, 59-65, 8 pages.
Waters et al., "The impact of geomechanics and perforations on hydraulic fracture initiation and complexity in horizontal well completions" SPE-181684-MS. The Proceedings of the SPE Annual Technical Conference and Exhibition held in Dubai, UAE, Sep. 26-28, 2016, 36 pages.
Weng et al., "Analytical model for predicting fracture initiation pressure from a cased and perforated wellbore" SPE-191462-18IHFT-MS, The Proceeding of the SPE International Hydraulic Fracturing Technology Conference and Exhibition, Muscat, Oman, Oct. 16-18, 2018, 21 pages.

* cited by examiner

| MD | Azimuth | Deviation | Casing ID | Casing OD | Cement ID | Cement OD | Borehole ID | Casing YM | Casing PR | Cement YM | Cement PR | Rock YM | Rock PR |
|---|---|---|---|---|---|---|---|---|---|---|---|---|---|
| ft | Degree | Degree | in | in | in | in | in | psi | | psi | | psi | |
| 10000 | 0 | 85 | 4.09 | 4.5 | 4.5 | 5.875 | 5.875 | 29000000 | 0.2 | 2900000 | 0.2 | 2900000 | 0.22 |
| 10500 | 1 | 86 | 4.09 | 4.5 | 4.5 | 5.875 | 5.875 | 29000000 | 0.2 | 2900000 | 0.2 | 2900000 | 0.22 |
| 11000 | 2 | 87 | 4.09 | 4.5 | 4.5 | 5.875 | 5.875 | 29000000 | 0.2 | 2900000 | 0.2 | 2900000 | 0.22 |
| 11500 | 3 | 88 | 4.09 | 4.5 | 4.5 | 5.875 | 5.875 | 29000000 | 0.2 | 2900000 | 0.2 | 2900000 | 0.22 |
| 12000 | 4 | 89 | 4.09 | 4.5 | 4.5 | 5.875 | 5.875 | 29000000 | 0.2 | 2900000 | 0.2 | 2900000 | 0.22 |
| 12500 | 5 | 90 | 4.09 | 4.5 | 4.5 | 5.875 | 5.875 | 29000000 | 0.2 | 2900000 | 0.2 | 2900000 | 0.22 |
| 13000 | 6 | 91 | 4.09 | 4.5 | 4.5 | 5.875 | 5.875 | 29000000 | 0.2 | 2900000 | 0.2 | 2900000 | 0.22 |
| 13500 | 7 | 92 | 4.09 | 4.5 | 4.5 | 5.875 | 5.875 | 29000000 | 0.2 | 2900000 | 0.2 | 2900000 | 0.22 |
| 14000 | 8 | 93 | 4.09 | 4.5 | 4.5 | 5.875 | 5.875 | 29000000 | 0.2 | 2900000 | 0.2 | 2900000 | 0.22 |
| 14500 | 9 | 94 | 4.09 | 4.5 | 4.5 | 5.875 | 5.875 | 29000000 | 0.2 | 2900000 | 0.2 | 2900000 | 0.22 |
| 15000 | 10 | 95 | 4.09 | 4.5 | 4.5 | 5.875 | 5.875 | 29000000 | 0.2 | 2900000 | 0.2 | 2900000 | 0.22 |

| MD | Azimuth | Deviation | Sv | Shmin | Shmax | Shmax Azimuth | PP | Pw_0 | Pw_60 | Pw_120 | Pw_180 | Pw_240 | Pw_300 | Pw_360 | Pw_min |
|---|---|---|---|---|---|---|---|---|---|---|---|---|---|---|
| ft | Degree | Degree | psi | psi | psi | Degree | psi | psi | psi | psi | psi | psi | psi | psi | psi |
| 10000 | 0 | 85 | 10500 | 2961.54 | 3701.92 | 0 | 5000 | 11716.9 | 8915.5 | 8915.5 | 11716.9 | 8915.5 | 8915.5 | 11716.9 | 8915.5 |
| 10500 | 1 | 86 | 10500 | 2961.54 | 3701.92 | 0 | 5000 | 11736.5 | 8926.2 | 8918.8 | 11736.5 | 8926.2 | 8918.8 | 11736.5 | 8918.8 |
| 11000 | 2 | 87 | 10500 | 2961.54 | 3701.92 | 0 | 5000 | 11751.8 | 8931.8 | 8920.6 | 11751.8 | 8931.8 | 8920.6 | 11751.8 | 8920.6 |
| 11500 | 3 | 88 | 10500 | 2961.54 | 3701.92 | 0 | 5000 | 11762.6 | 8932.1 | 8920.9 | 11762.6 | 8932.1 | 8920.9 | 11762.6 | 8920.9 |
| 12000 | 4 | 89 | 10500 | 2961.54 | 3701.92 | 0 | 5000 | 11769.1 | 8927.2 | 8919.8 | 11769.1 | 8927.2 | 8919.8 | 11769.1 | 8919.8 |
| 12500 | 5 | 90 | 10500 | 2961.54 | 3701.92 | 0 | 5000 | 11771.3 | 8917.1 | 8917.1 | 11771.3 | 8917.1 | 8917.1 | 11771.3 | 8917.1 |
| 13000 | 6 | 91 | 10500 | 2961.54 | 3701.92 | 0 | 5000 | 11769.2 | 8901.9 | 8913.0 | 11769.2 | 8901.9 | 8913.0 | 11769.2 | 8901.9 |
| 13500 | 7 | 92 | 10500 | 2961.54 | 3701.92 | 0 | 5000 | 11763.1 | 8881.6 | 8907.4 | 11763.1 | 8881.6 | 8907.4 | 11763.1 | 8881.6 |
| 14000 | 8 | 93 | 10500 | 2961.54 | 3701.92 | 0 | 5000 | 11753.3 | 8856.2 | 8900.2 | 11753.3 | 8856.2 | 8900.2 | 11753.3 | 8856.2 |
| 14500 | 9 | 94 | 10500 | 2961.54 | 3701.92 | 0 | 5000 | 11740.0 | 8826.0 | 8891.6 | 11740.0 | 8826.0 | 8891.6 | 11740.0 | 8826.0 |
| 15000 | 10 | 95 | 10500 | 2961.54 | 3701.92 | 0 | 5000 | 11723.5 | 8790.9 | 8881.5 | 11723.5 | 8790.9 | 8881.5 | 11723.5 | 8790.9 |

| MD | Azimuth | Deviation | Sv | Shmin | Shmax | Shmax Azimuth | PP | Pw_0 | Pw_60 | Pw_120 | Pw_180 | Pw_240 | Pw_300 | Pw_360 | Pw_min |
|---|---|---|---|---|---|---|---|---|---|---|---|---|---|---|
| ft | Degree | Degree | psi | psi | psi | Degree | psi | psi | psi | psi | psi | psi | psi | psi | psi |
| 10000 | 0 | 85 | 10500 | 2961.538 | 3701.9231 | 0 | 5000 | 9853.1 | 9484.2 | 9484.2 | 9853.1 | 9484.2 | 9484.2 | 9853.1 | 9484.2 |
| 10500 | 1 | 86 | 10500 | 2961.538 | 3701.9231 | 0 | 5000 | 9869.9 | 9507.4 | 9498.2 | 9869.9 | 9507.4 | 9498.2 | 9869.9 | 9498.2 |
| 11000 | 2 | 87 | 10500 | 2961.538 | 3701.9231 | 0 | 5000 | 9883.7 | 9522.4 | 9508.6 | 9883.7 | 9522.4 | 9508.6 | 9883.7 | 9508.6 |
| 11500 | 3 | 88 | 10500 | 2961.538 | 3701.9231 | 0 | 5000 | 9894.7 | 9529.0 | 9515.2 | 9894.7 | 9529.0 | 9515.2 | 9894.7 | 9515.2 |
| 12000 | 4 | 89 | 10500 | 2961.538 | 3701.9231 | 0 | 5000 | 9902.6 | 9527.3 | 9518.1 | 9902.6 | 9527.3 | 9518.1 | 9902.6 | 9518.1 |
| 12500 | 5 | 90 | 10500 | 2961.538 | 3701.9231 | 0 | 5000 | 9907.6 | 9517.1 | 9517.1 | 9907.6 | 9517.1 | 9517.1 | 9907.6 | 9517.1 |
| 13000 | 6 | 91 | 10500 | 2961.538 | 3701.9231 | 0 | 5000 | 9909.7 | 9498.6 | 9512.3 | 9909.7 | 9498.6 | 9512.3 | 9909.7 | 9498.6 |
| 13500 | 7 | 92 | 10500 | 2961.538 | 3701.9231 | 0 | 5000 | 9909.0 | 9471.9 | 9503.7 | 9909.0 | 9471.9 | 9503.7 | 9909.0 | 9471.9 |
| 14000 | 8 | 93 | 10500 | 2961.538 | 3701.9231 | 0 | 5000 | 9905.4 | 9437.0 | 9491.3 | 9905.4 | 9437 | 9491.3 | 9905.4 | 9437.1 |
| 14500 | 9 | 94 | 10500 | 2961.538 | 3701.9231 | 0 | 5000 | 9899.1 | 9394.4 | 9475.2 | 9899.1 | 9394.4 | 9475.2 | 9899.1 | 9394.4 |
| 15000 | 10 | 95 | 10500 | 2961.538 | 3701.9231 | 0 | 5000 | 9890.3 | 9344.2 | 9455.3 | 9890.3 | 9344.2 | 9455.3 | 9890.3 | 9344.2 |

DETERMINING A SUBTERRANEAN FORMATION BREAKDOWN PRESSURE

TECHNICAL FIELD

The present disclosure describes systems and methods for determining a subterranean formation breakdown pressure and, more particularly, determining a subterranean formation breakdown pressure for a deviated, cased hole and clustered perforation hydraulic fracturing treatment.

BACKGROUND

Hydraulic fracturing has been used to stimulate tight sandstone and shale gas reservoirs. Rock breakdown or fracture initiation is typically required for a successful hydraulic fracturing treatment. For hydraulic fracturing treatments, accurately estimating a breakdown pressure of a subterranean formation may help determine correct selections of casing size, tubing size, and wellhead (for example, to correctly select their respective burst pressure limiting requirements), as well as a pump schedule design. Otherwise, the hydraulic fracturing operation may not properly inject a fracturing liquid to fracture the formation (for example, if the breakdown pressure was underestimated). Conventionally, hydraulic fracturing simulators may not accurately predict the breakdown pressure due to, for example, model simplifications.

SUMMARY

This disclosure describes implementations of a computational framework for determining a breakdown pressure of a subterranean formation for informing one or more hydraulic fracturing operation decisions. In some aspects, the computational framework determines a breakdown pressure of a subterranean formation through which a cased, deviated wellbore that includes one or more perforation clusters are formed.

In an example implementation of the present disclosure that can be realized in a computer-implemented method, a system, and an apparatus of a tangible, non-transitory computer-readable media, techniques for determining a breakdown pressure of a subterranean formation include identifying, with one or more hardware processors, in-situ stresses for a portion of a wellbore formed from a terranean surface into a subterranean formation; transforming, with the one or more hardware processors, the in-situ stresses from a global coordinate system to a wellbore coordinate system of a deviated portion of the wellbore that includes at least one perforation tunnel for a hydraulic fracturing treatment; transforming, with one or more hardware processors, the in-situ stresses from the wellbore coordinate system to a perforation coordinate system through at least one rotation matrix; determining, with one or more hardware processors, one or more stresses at a wellbore-perforation interface of the perforation tunnel from the in-situ stresses in the perforation coordinate system; calculating, with one or more hardware processors, one or more hoop stresses at a perforation tunnel wall of the perforation tunnel from the determined one or more stresses on the wellbore-perforation interface; and determining, with one or more hardware processors, a breakdown pressure for the subterranean formation based at least in part on the calculated one or more hoop stresses.

In an aspect combinable withe the example implementation, the global coordinate system includes an x-axis directed toward north, a y-axis directed toward east, and a z-axis directed vertically downwards from the terranean surface.

In another aspect combinable with any of the previous aspects, the wellbore coordinate system is defined by a measured depth, a wellbore deviation, and a wellbore azimuth.

In another aspect combinable with any of the previous aspects, transforming the in-situ stresses from the global coordinate system to the wellbore coordinate system includes rotating the wellbore deviation about the y-axis; and rotating the wellbore azimuth about the z-axis.

In another aspect combinable with any of the previous aspects, transforming the in-situ stresses from the wellbore coordinate system to the perforation coordinate system through the at least one rotation matrix includes rotating a first perforation phase angle about a first axis of the wellbore coordinate system; and rotating a second perforation phase angle about a second axis of the wellbore coordinate system.

In another aspect combinable with any of the previous aspects, determining one or more stresses at the wellbore-perforation interface of the perforation tunnel from the in-situ stresses in the perforation coordinate system includes determining a far-field in-situ stress tensor that acts on a wellbore-perforation interface between the deviated portion of the wellbore and the perforation tunnel wall; determining a bottom hole pressure that acts on the subterranean formation adjacent the perforation tunnel wall from a fracturing liquid; determining a pressure within the at least one perforation tunnel that induces stress on the perforation tunnel wall; and calculating the one or more stresses on the perforation tunnel wall from the determinations of the far-field in-situ stress tensor, the bottom hole pressure, and the pressure within the at least one perforation tunnel.

In another aspect combinable with any of the previous aspects, determining the bottom hole pressure that acts on the subterranean formation adjacent the perforation tunnel wall from the fracturing liquid includes determining a pressure at an interface of the subterranean formation and a cement layer that binds a wellbore casing to the subterranean formation based on a pressure of the fracturing liquid.

In another aspect combinable with any of the previous aspects, determining the pressure within the at least one perforation tunnel that induces stress on the perforation tunnel wall includes determining the pressure within the at least one perforation tunnel by subtracting a perforation pressure loss from the bottom hole pressure.

In another aspect combinable with any of the previous aspects, calculating one or more hoop stresses at the perforation tunnel wall of the perforation tunnel from the determined one or more stresses on the wellbore-perforation interface includes summing induced stresses based on the far-field in-situ stress tensor and the bottom hole pressure; calculating local maximum and minimum stresses at the wellbore-perforation interface based on the far-field in-situ stress tensor and the bottom hole pressure; and calculating the one or more hoop stresses around the at least one perforation tunnel.

In another aspect combinable with any of the previous aspects, determining the breakdown pressure for the subterranean formation based at least in part on the calculated one or more hoop stresses includes solving for the breakdown pressure with a quadratic equation that includes the one or more calculated hoop stresses, the bottom hole pressure, and a tensile strength of the subterranean formation.

Another aspect combinable with any of the previous aspects further includes generating, with the one or more hardware processors, data that includes a graphic that represents the determined breakdown pressure for the subterranean formation; and presenting the generated data through a graphical user interface (GUI).

Implementations of a computational framework for determining a breakdown pressure of a subterranean formation according to the present disclosure may include one or more of the following features. For example, implementations of the computational framework may better inform operational decisions for hydraulic fracturing for deep and tight gas reservoirs, which face breakdown issues. As another example, implementations of the computational framework may more accurately estimate the breakdown pressure for a more accurate selection of casing, treatment tube, wellhead, and pump schedule design for a hydraulic fracturing operation. As another example, implementations of the computational framework may determine breakdown pressure for three-dimensional (for example, deviated) cased hole/clustered perforation hydraulic fracturing treatments. As another example, implementations of the computational framework may automatically account for several factors: deviated and cased hole, impact of casing-cement mechanical properties, perforation friction loss, and perforation phase angles among others. As another example, implementations of the computational framework may reasonably predict the trend correctly and can be a practical tool for quickly estimating the breakdown pressure in hydraulic fracturing practice.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIGS. 12A-12C illustrate tables that show output data from a computer-implemented method for determining a subterranean formation breakdown pressure for perforation clusters according to the present disclosure.

DETAILED DESCRIPTION

Figure 1:
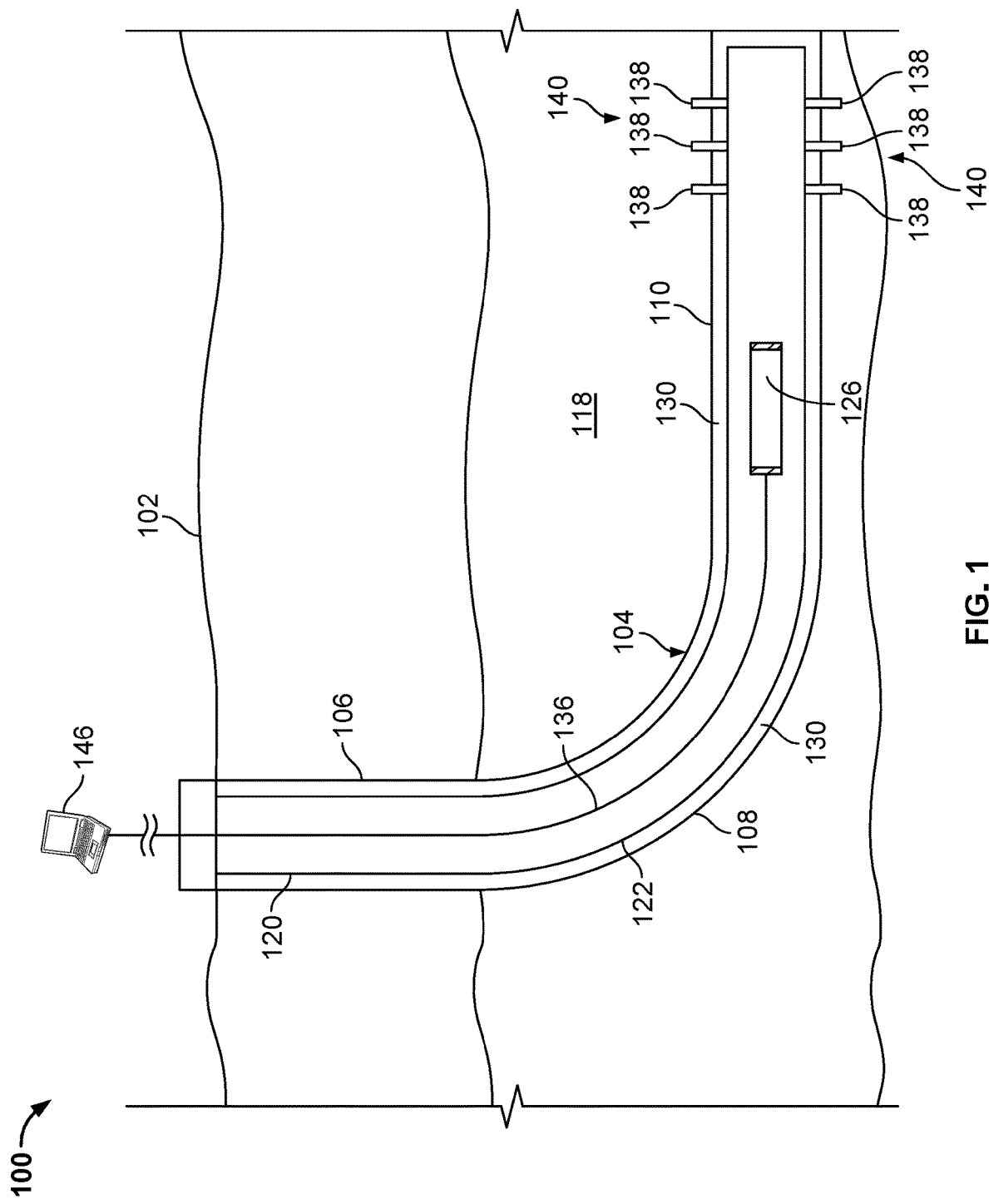
FIG. 1 is a schematic diagram of an example implementation of a wellbore system according to the present disclosure.

FIG. 1 is a schematic diagram of an example implementation of a wellbore system 100 according to the present disclosure. In some aspects, the wellbore system 100 (all or part of it) may provide a wellbore system and computational framework (for example, embodied in control system 146) for calculating a breakdown pressure of a subterranean formation. In some aspects, the wellbore system 100 (and the computational framework) provides such a determination for a deviated, cased hole, and clustered perforation hydraulic fracturing treatment, while taking into account an impact of casing-cement mechanical properties on the breakdown pressure.

In some aspects, the computational framework (for example, executed on a control system 146) of wellbore system 100 provides for a layout of a series of coordinate system transformations and corresponding rotation matrices, for example, to streamline a stress tensor projection onto different coordinate systems. The computational framework of wellbore system 100 may also account for one or more effects of casing-cement intermediate layers in a deviated wellbore to calculate the breakdown pressure of a subterranean formation. The computational framework of wellbore system 100 may also account for a potential effect of perforation quality on estimating the breakdown pressure of a subterranean formation. The computational framework of wellbore system 100 improves current available models on calculating breakdown pressure, for example, which are applicable to deviated, cased wellbores, and clustered perforation hydraulic fracturing treatments.

As illustrated, the wellbore system 100 includes a wellbore 104 formed (for example, drilled or otherwise) from a terranean surface 102 and to and into subterranean formation 118. Although the terranean surface 102 is illustrated as a land surface, terranean surface 102 may be a sub-sea or other underwater surface, such as a lake or an ocean floor or other surface under a body of water. Thus, the present disclosure contemplates that the wellbore 104 may be formed under a body of water from a drilling location on or proximate the body of water.

The illustrated wellbore 104 is a directional wellbore in this example of wellbore system 100. For instance, the wellbore 104 includes a substantially vertical portion 106 coupled to a radiussed or curved portion 108, which in turn is coupled to a substantially horizontal portion 110. As used in the present disclosure, "substantially" in the context of a wellbore orientation, refers to wellbores that may not be exactly vertical (for example, exactly perpendicular to the terranean surface 102) or exactly horizontal (for example, exactly parallel to the terranean surface 102). In other words, those of ordinary skill in the drill arts would recognize that vertical wellbores often undulate offset from a true vertical direction that they might be drilled at an angle that deviates from true vertical, and horizontal wellbores often undulate offset from a true horizontal direction. Further, the substantially horizontal portion 110, in some aspects, may be a slant wellbore or other directional wellbore that is oriented between exactly vertical and exactly horizontal. The substantially horizontal portion 110, in some aspects, may be oriented to follow a slant of the formation. As illustrated in this example, the three portions of the wellbore 104—the vertical portion 106, the radiussed portion 108, and the horizontal portion 110—form a continuous wellbore 104 that extends into the Earth. Thus, in this example implementation, at least a portion of the wellbore 104, such as the radiussed portion 108 and the horizontal portion 110, may be considered a deviated wellbore, in other words, a non-vertical wellbore.

The illustrated wellbore 104 has a surface casing 120 positioned and set around the wellbore 104 from the terranean surface 102 into a particular depth in the Earth. For example, the surface casing 120 may be a relatively large-diameter tubular member (or string of members) set (for example, cemented) around the wellbore 104 in a shallow formation. As used herein, "tubular" may refer to a member that has a circular cross-section, elliptical cross-section, or other shaped cross-section. As illustrated, a production casing 122 is positioned and set within the wellbore 104 downhole of the surface casing 120. Although termed a "production" casing, in this example, the casing 122 may or may not have been subject to hydrocarbon production operations. Thus, the casing 122 refers to and includes any form of tubular member that is set (for example, cemented) in the wellbore 104 downhole of the surface casing 120. In some examples of the wellbore system 100, the production casing 122 may begin at an end of the radiussed portion 108 and extend throughout the substantially horizontal portion 110. The casing 122 could also extend into the radiussed portion 108 and into the vertical portion 106.

As shown, cement 130 is positioned (for example, pumped) around the casings 120 and 122 in an annulus between the casings 120 and 122 and the wellbore 104. The cement 130, for example, may secure the casings 120 and 122 (and any other casings or liners of the wellbore 104) through the subterranean layers under the terranean surface 102. In some aspects, the cement 130 may be installed along the entire length of the casings (for example, casings 120 and 122 and any other casings), or the cement 130 could be used along certain portions of the casings if adequate for the particular wellbore 104. Other casings, such as conductor casings or intermediate casings, are also contemplated by the present disclosure for the wellbore system 100.

As illustrated, the wellbore 104 extends through one or more subterranean layers (not specifically labeled) and lands in subterranean formation 118. The subterranean formation 118, in this example, may be chosen as the landing for the substantially horizontal portion 110, for example, in order to initiate completion operations such as hydraulic fracturing operations and ultimately recover hydrocarbon fluids from the subterranean formation. In some examples, the subterranean formation 118 is composed of shale or tight sandstone. Shale, in some examples, may be source rocks that provide for hydrocarbon recovery from the subterranean formation 118.

As shown in FIG. 1, the wellbore system 100 includes one or more perforation tunnels 138 (also known as perforations 138) that are formed from the wellbore 104, through the casing 122 and the cement 130, and extend into the subterranean formation 118. Generally, the perforation tunnels 138 may be formed by, for example, shaped explosive charges, water jetting, laser, or other conventional perforating techniques. In some aspects, multiple perforation tunnels 138 may comprise a perforation stage 140. Each perforation tunnel 138, as well as each perforation cluster 140, may provide a path (or paths) for a hydraulic fracturing liquid (with or without proppant) to enter the subterranean formation 118 from the wellbore 104 in order to initiate and propagate hydraulic fractures (extending from the perforation tunnels 138) through the subterranean formation 118.

As shown in FIG. 1, the example implementation of the wellbore system 100 also includes a logging tool 126 that is communicably coupled to a downhole conveyance 136, such as a wirelines, optical line, or other data communication cable. The downhole conveyance 136 provides data from the logging tool 126 to the control system 146, for real time (for example, during logging operations) or later usage in determining a breakdown pressure of the subterranean formation 118. In some aspects, the control system 148 comprises a microprocessor based control system that includes, for example, one or more hardware processors, one or more memory storage devices (for example, tangible, non-transitory computer-readable memory modules), one or more network interfaces, and one or more input/output devices, including, for example, a graphical user interface (GUI) to present one or more determinations or data from the computer framework for determining a breakdown pressure of a subterranean formation.

Figure 2:
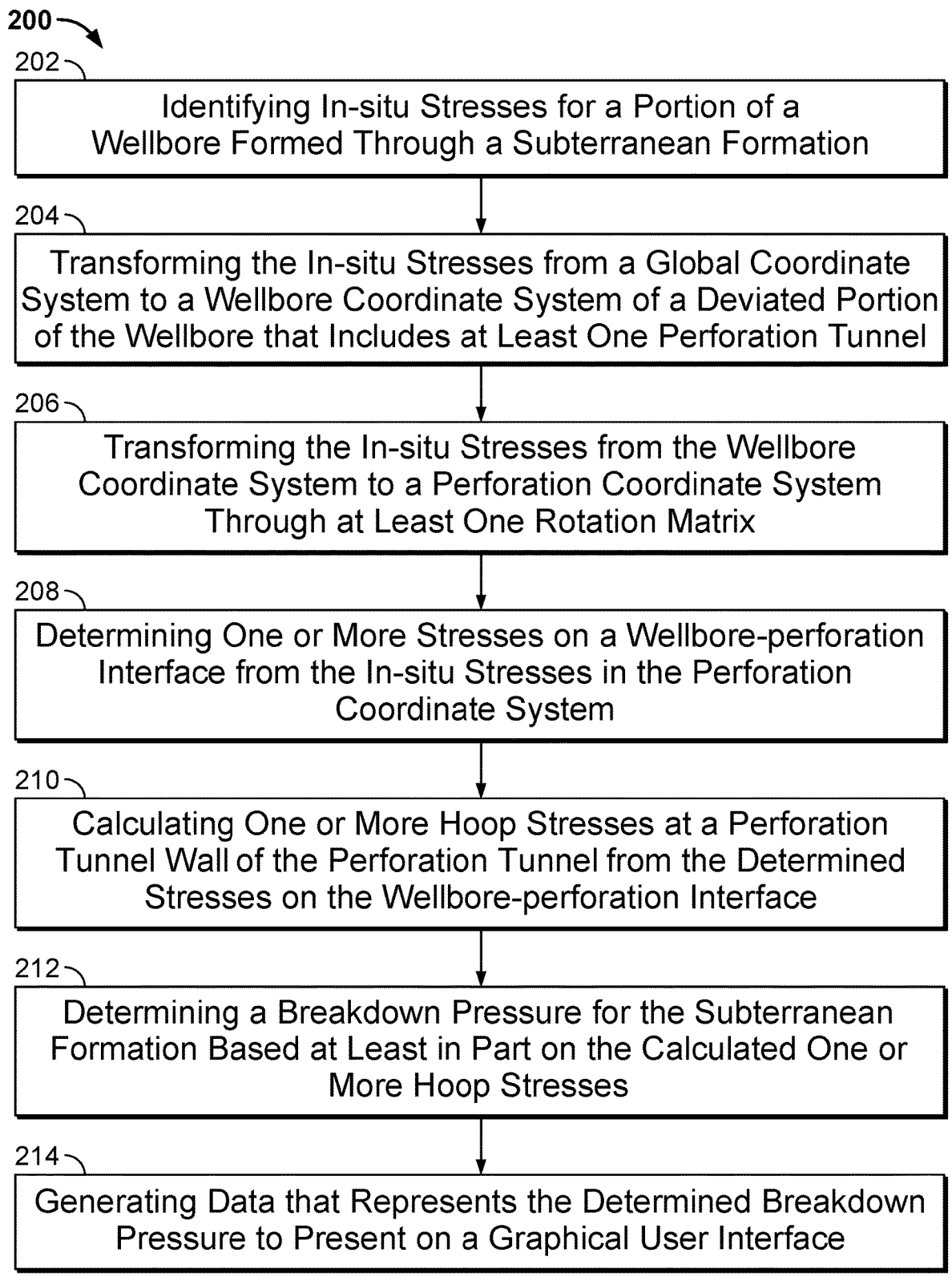
FIG. 2 illustrates a flowchart that describes an example method for determining a subterranean formation breakdown pressure according to the present disclosure.

FIG. 2 illustrates a flowchart that describes an example method 200 for determining a subterranean formation breakdown pressure according to the present disclosure. In some aspects, method 200 may be performed with or by all or parts of the wellbore system 100, including the control system 146 that is communicably coupled to receive, for example, logging data about the subterranean formation 118 from the logging tool 126.

In some aspects, method 200 is part of a computational framework executed by, for instance, the control system 146, in order to determine the breakdown pressure of the subterranean formation 118 through which the wellbore 104 (for example, as a cased, cemented, deviated wellbore) is formed. For example, in some aspects, conventional hydraulic fracturing simulators cannot accurately predict the breakdown pressure due to model simplifications that may use a large mesh size. Also, such conventional simulators may not take into account or inaccurately take into account issues related to deviation of the wellbore, casing, cement, and casing-cement-formation interaction. Such conventional simulators may typically model hydraulic fractures that initiate from perforation clusters and propagate along a maximum principal stress directions of the subterranean formation as long as hydraulic fracturing fluid injection is maintained. A few conventional models are only applicable to vertical (in other words, non-deviated), open hole (in other words, without casing) wellbores. The computational framework for calculating the breakdown pressure of the present disclosure, however, is applicable to deviated, cased wellbores with clustered perforations so as to determine breakdown pressure to guide and inform hydraulic fracturing treatments.

Method 200 may begin at step 202, which includes identifying in-situ stresses for a wellbore formed through a subterranean formation. For example, in some aspects, the logging tool 126 may derive or generate an image log of the subterranean formation 118, from which the maximum principal stress angle of the subterranean formation 118 can be obtained. From the maximum principal stress angle and borehole image, a maximum principal stress of the subterranean formation 118 can be estimated and in-situ stresses may be calibrated and finally determined.

In some aspects, the in-situ stresses can be calculated according to a number of parameters. For example, such parameters may include the image log, which includes wellbore TVD, azimuth, and deviation. The parameters may also include stress orientations. The parameters may also include the mechanical properties of, for example, the casing 122, the cement 130, and the subterranean formation 118 itself.

For example, an in-situ stress field of the subterranean formation 118 exists in the far field and takes the form as follows:

$$\sigma_{in} = \begin{pmatrix} \sigma_{xx} & \tau_{xy} & \tau_{xz} \\ \tau_{yx} & \sigma_{yy} & \tau_{yz} \\ \tau_{zx} & \tau_{zy} & \sigma_{zz} \end{pmatrix} \text{ or} \quad (1)$$

$$\sigma_{Pr} = \begin{pmatrix} \sigma_{Hmax} & 0 & 0 \\ 0 & \sigma_{Hmin} & 0 \\ 0 & 0 & \sigma_V \end{pmatrix}.$$

In Eq. 1, $\sigma_{Hmax}$ and $\sigma_{Hmin}$ are the maximum and minimum horizontal stresses respectively, and $\sigma_V$ is the principal vertical stress component. The dynamic Young's modulus and Poisson's ratio can be calculated using, for example, a sonic log from the logging tool 126, then converted to a static modulus based on correlations. The vertical stress $S_V$ (total stress) or $\sigma_V$ (effective stress) can be reasonably calculated based on, for example, a density log of the logging tool 126, as:

$$S_V = \int \rho dZ, \ \sigma_V = S_V - \alpha P_0 \quad (2).$$

Without considering tectonic stresses, the effective and total minimum horizontal stress can be approximately calculated by:

$$\sigma_{Hmin} = \frac{\mu}{1-\mu}\sigma_V, \ S_{Hmin} = \frac{\mu}{1-\mu}(\sigma_V - \alpha P_0) + \alpha P_0. \quad (3)$$

In Eq. 3, $\alpha$ is the Biot's poroelastic parameter and $P_0$ is reservoir pressure. The maximum principal stress can be estimated based on, for example, the image log by calibrating the maximum horizontal stress magnitude against a drilling fluid ("mud") weight and observed breakout and breakdown zone exhibited in the image log data.

In a conventional analysis for a vertical open hole, the maximum principal stress can be obtained based on the breakdown pressure from a leak off test during drilling. The above equation assumes the horizontal strain equal to zero. Under the tectonic regime with given horizontal strains $\varepsilon_{Hmax}$ and $\varepsilon_{Hmin}$, the maximum and minimum horizontal stresses can be generally calculated by:

$$S_{Hmin} = \frac{\mu}{1-\mu}(\sigma_V - \alpha P_0) + \alpha P_0 + \frac{E}{1-\mu^2}(\varepsilon_{Hmin} + \mu\varepsilon_{Hmax}), \quad (4)$$

$$S_{Hmax} = \frac{\mu}{1-\mu}(\sigma_V - \alpha P_0) + \alpha P_0 + \frac{E}{1-\mu^2}(\mu\varepsilon_{Hmin} + \varepsilon_{Hmax}). \quad (5)$$

Drilling the wellbore 104 in and through the subterranean formation 118 leads to a stress redistribution around the wellbore 104. The wellbore 104 is generally supported by drilling fluid pressure acting on the wellbore wall. Accurately estimating the stresses around the wellbore 104 may be necessary for wellbore stability. Also, it may be helpful to determine the breakdown pressure for hydraulic fracturing design, which directly impacts the selection of casing size, treatment tubing size, wellhead, steel grade, pump schedule, and other equipment.

Figure 3:
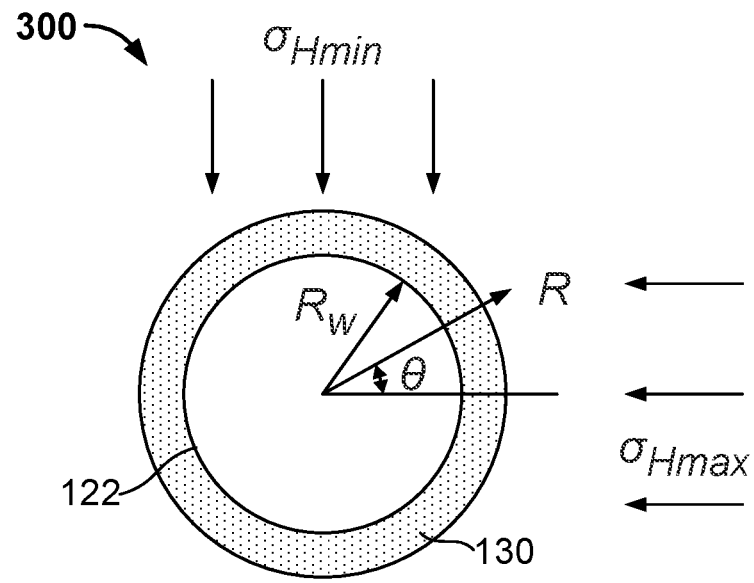
FIG. 3 illustrates a schematic view cross-section of a cased, vertical wellbore with particular stresses according to the present disclosure.

For example, FIG. 3 illustrates a schematic top view cross-section 300 of a cased, vertical wellbore with particular stresses. In cross-section 300, $R_w$ represents the wellbore radius, and R represents a radial distance from the concentric center of the casing 122 and cement 130, along with the effective total minimum and maximum horizontal stresses, $\sigma_{Hmax}$ and $\sigma_{Hmin}$.

For a conventional, vertical open-hole wellbore, it is a generally accepted convention that the three far field principal stresses and orientation are known for a conventional vertical, open hole wellbore. The elastic solutions of the effective stresses around wellbore based on plane strain condition are given by:

$$\sigma_r = \frac{(\sigma_{Hmax} + \sigma_{Hmin})}{2}\left(1 - \frac{R_w^2}{R^2}\right) + \quad (6),$$
$$\frac{(\sigma_{Hmax} - \sigma_{Hmin})}{2}\left(1 - 4\frac{R_w^2}{R^2} + 3\frac{R_w^4}{R^4}\right) + (P_w - P_0)\frac{R_w^2}{R^2},$$

$$\sigma_\theta = \frac{(\sigma_{Hmax} + \sigma_{Hmin})}{2}\left(1 + \frac{R_w^2}{R^2}\right) + \quad (7).$$
$$\frac{(\sigma_{Hmax} - \sigma_{Hmin})}{2}\left(1 + 3\frac{R_w^4}{R^4}\right)\cos 2\theta - (P_w - P_0)\frac{R_w^2}{R^2}.$$

In Eqs. 6 and 7, $\sigma_r$ is the radial stress acting outwards from the wellbore; $\sigma_\theta$ is the hoop stress around the wellbore; $\theta$ is the angle from the direction of $\sigma_{xx}$; $P_w$ is the wellbore pressure; and $P_0$ is the reservoir pressure. For an open-hole wellbore, limiting this to the wellbore wall with $R=R_w$ leads to:

$$\sigma_r = P_w - P_0 \quad (8),$$

$$\sigma_\theta = (\sigma_{Hmax} + \sigma_{Hmin}) - 2(\sigma_{Hmax} - \sigma_{Hmin})\cos 2\theta - (P_w - P_0) \quad (9),$$

$$\tau_{r\theta} = 0 \quad (10).$$

For the hydraulic fracturing, tensile failure criteria is generally used to direct the fracture propagation trajectory; therefore a fracture propagates at the direction of maximum horizontal stress. The corresponding hoop stress at $\theta=0$ yields:

$$\sigma_\theta = 3\sigma_{Hmin} - \sigma_{Hmax} - (P_w - P_0) \quad (11).$$

Breakdown pressure is determined based on tensile failure. If the hoop stress turns into tension at wellbore wall and exceeds the material's tensile strength T, the material (in other words, the rock) will fail in tensile mode:

$$\sigma_\theta = -T \quad (12),$$

$$P_w = 3\sigma_{Hmin} - \sigma_{Hmax} + P_0 + T \text{ (in terms of effective stress)} \quad (13).$$

Eq. 13 is generally used to predict the required drilling mud weight in the conventional, vertical open-hole example, which can avoid wellbore breakdown issues during drillings. For horizontal wells drilled in the subterranean formations (such as deep and tight reservoirs), the horizontal parts are generally drilled in the minimum horizontal stress direction and thereafter is cased and cemented. After perforating the casing, fluid injection is executed to initiate hydraulic fractures from the perforation towards the maximum horizontal stress direction. In such situations, the computational framework of the present disclosure may calculate the hoop stress around the perforation tunnel for judging whether fracture can be initiated or not, even though the hoop stress with respect to the wellbore is not the main concern. For a cased and cemented wellbore with perforation clusters (such as wellbore 104). The breakdown pressure refers to the bottom hole pressure inside the casing that leads to tensile failure within the area of the wellbore-perforation interface. Therefore, Eq. 13 cannot be directly used to estimate the breakdown pressure for deviated, cased wellbores with clustered perforations for a hydraulic fracturing treatment (such as wellbore 104).

Method 200 may continue at step 204, which includes transforming the in-situ stresses from a global coordinate system to a wellbore coordinate system of a deviated wellbore that includes at least one perforation tunnel. In some aspects, step 204 may also include calculating coefficient of pressure transferred, for example, from a hydraulic fracturing fluid to the subterranean formation 118 through the casing 122 and cement 130 as well as pressure loss due to perforation friction.

Figure 4:
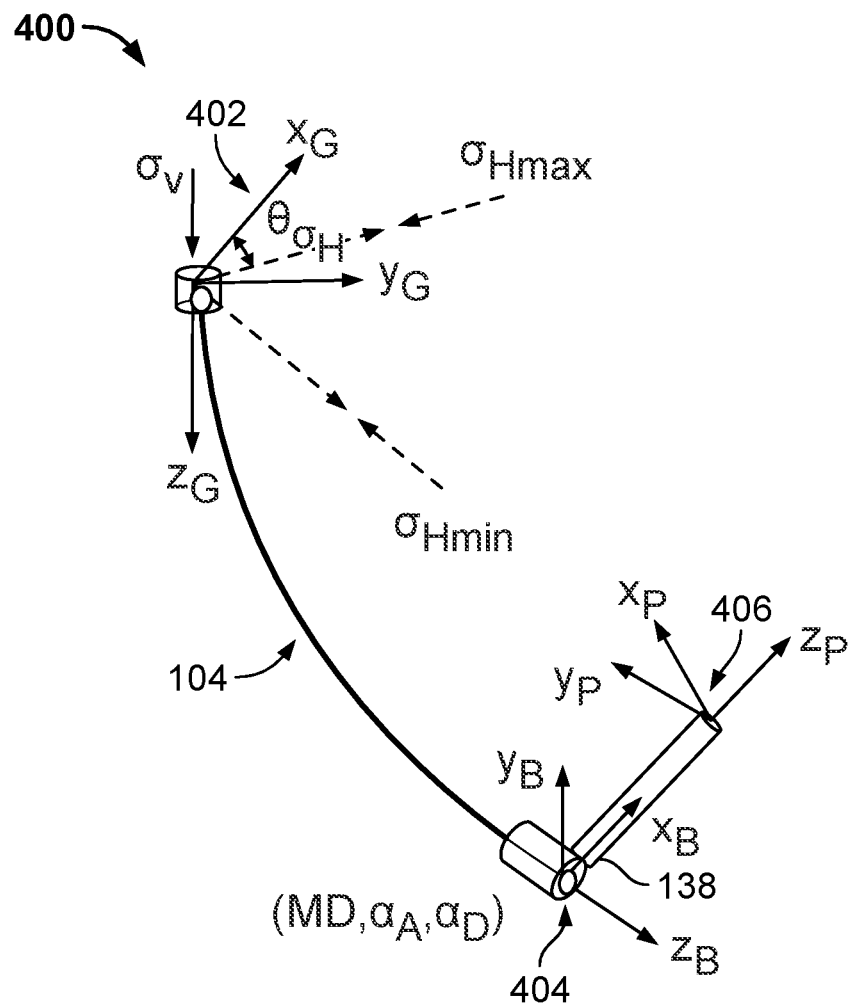
FIG. 4 illustrates a schematic side view of a deviated wellbore that shows a series of coordinate systems used in a computational framework according to the present disclosure.

For example, for a deviated wellbore such as wellbore 104, the in-situ stresses may be transformed between different coordinate systems. For example, the in-situ stresses may be transformed from a global coordinate system to a wellbore coordinate system. FIG. 4 illustrates a schematic side view 400 of the wellbore 104 that includes at least one perforation tunnel 138 with overlaid coordinate systems. In the global coordinate system 402, as shown in FIG. 4, the x-axis aligns with north (true north), the y-axis aligns with east, and the z-axis is vertically downward (for example, into the Earth). This coordinate system 402 is denoted by global coordinate system $(x_G y_G z_G)$. In some aspects, it is assumed that the azimuth of maximum principal stress is $\theta_{\sigma_H}$, which is the angle turning clockwise from north to the maximum principle stress. Therefore, a rotation matrix is given by:

$$R_{\sigma_H \to x_G} = \begin{pmatrix} \cos\theta_{\sigma_H} & -\sin\theta_{\sigma_H} & 0 \\ \sin\theta_{\sigma_H} & \cos\theta_{\sigma_H} & 0 \\ 0 & 0 & 1 \end{pmatrix}. \quad (14)$$

In Eq. 14, $\theta_{\sigma_H}$ should be positive if the maximum principal stress, $\sigma_{Hmax}$, is clockwise to the axis, $x_G$, and is negative if it is counter clockwise to the axis, $x_G$. The equivalent stress tensor in the global coordinate system 402 that is rotated by a maximum stress angle $\theta_{\sigma_H}$ around the z-axis can be calculated by:

$$\sigma^G = R_{\sigma_H \to x_G} \sigma_{Pr} R^T_{\sigma_H \to x_G}, \quad (15)$$

$$\begin{cases} \sigma^G_{xx} = C_G^2 \sigma_{Hmax} + S_G^2 \sigma_{Hmin} \\ \sigma^G_{yy} = S_G^2 \sigma_{Hmax} + C_G^2 \sigma_{Hmin} \\ \sigma^G_{zz} = \sigma_V \\ \tau^G_{xy} = C_G S_G (\sigma_{Hmax} - \sigma_{Hmin}) \\ \tau^G_{yz} = 0 \\ \tau^G_{zx} = 0 \end{cases}, \quad (16)$$

where $C_G = \cos\theta_{\sigma_H}$, $S_G = \sin\theta_{\sigma_H}$. In some aspects, this is the same as the stress rotation used in the objective stress update procedures for large deformation analysis in computational mechanics. For a well survey, any point in the well trajectory can be determined by three parameters: MD (measured depth), wellbore deviation $\alpha_D$, and wellbore azimuth $\alpha_A$. A wellbore coordinate system 404 at any point along the well trajectory can be tracked and obtained by the following rotations about the global coordinate system $x_G y_G z_G$. For example, such rotations can include: (1) rotation of deviation $\alpha_D$ about the $y_G$-axis; and (2) rotation of azimuth $\alpha_A$ about $z_G$-axis. Then, the rotation matrix is given by:

$$R_{G \to B}(\alpha_A, \alpha_D) = \quad (17)$$
$$R_y(\alpha_D) R_z(\alpha_A) = \begin{pmatrix} \cos\alpha_D & 0 & -\sin\alpha_D \\ 0 & 1 & 0 \\ \sin\alpha_D & 0 & \cos\alpha_D \end{pmatrix} \begin{pmatrix} \cos\alpha_A & \sin\alpha_A & 0 \\ -\sin\alpha_A & \cos\alpha_A & 0 \\ 0 & 0 & 1 \end{pmatrix}.$$

Eq. 17 may lead to:

$$R_{G \to B}(\alpha_A, \alpha_D) = \begin{pmatrix} \cos\alpha_D \cos\alpha_A & \cos\alpha_D \sin\alpha_A & -\sin\alpha_D \\ -\sin\alpha_A & \cos\alpha_A & 0 \\ \sin\alpha_D \cos\alpha_A & \sin\alpha_D \sin\alpha_A & \cos\alpha_D \end{pmatrix}. \quad (18)$$

Then, the in-situ stress tensor along the wellbore trajectory (in other words, the trajectory of wellbore 104) can be projected onto the wellbore coordinate system 404 by:

$$\sigma^{B,I} = R_{G \to B}(\alpha_D, \alpha_A) \sigma^G R^T_{G \to B}(\alpha_D, \alpha_A) = \begin{pmatrix} \sigma^{B,I}_{xx} & \tau^{B,I}_{xy} & \tau^{B,I}_{xz} \\ \tau^{B,I}_{yz} & \sigma^{B,I}_{yy} & \tau^{B,I}_{yz} \\ \tau^{B,I}_{zx} & \tau^{B,I}_{zy} & \sigma^{B,I}_{zz} \end{pmatrix}. \quad (19)$$

In Eq. 19, the superscript I represents the far field in-situ stress. Due to the lengthy expression of the stress components, the exact analytical expressions of Eq. 19 are not provided here but can be directly calculated through computer implementation.

The rotation matrix about the y-axis of the wellbore coordinate system 404 is given by:

$$R(\alpha_{y,B}) = \begin{pmatrix} \cos\alpha_{y,B} & 0 & -\sin\alpha_{y,B} \\ 0 & 1 & 0 \\ \sin\alpha_{y,B} & 0 & \cos\alpha_{y,B} \end{pmatrix}. \quad (20)$$

Thus, at the culmination of step 204, the in-situ stresses are transformed from a global coordinate system to a wellbore coordinate system.

Method 200 may continue at step 206, which includes transforming the in-situ stresses from the wellbore coordinate system to a perforation coordinate system through at least one rotation matrix. For example, in some aspects, rotating the y axis of the wellbore coordinate system 404 at any point along the wellbore axis by $\alpha_{y,B}=\pi/2$, generates a particular perforation coordinate system 406. The corresponding rotation matrix is:

$$R_{B\to P}\left(\alpha_{y,B}=\frac{\pi}{2}\right)=\begin{pmatrix}0 & 0 & -1\\ 0 & 1 & 0\\ 1 & 0 & 0\end{pmatrix}=R_{B\to P}^1. \tag{21}$$

Figure 5:
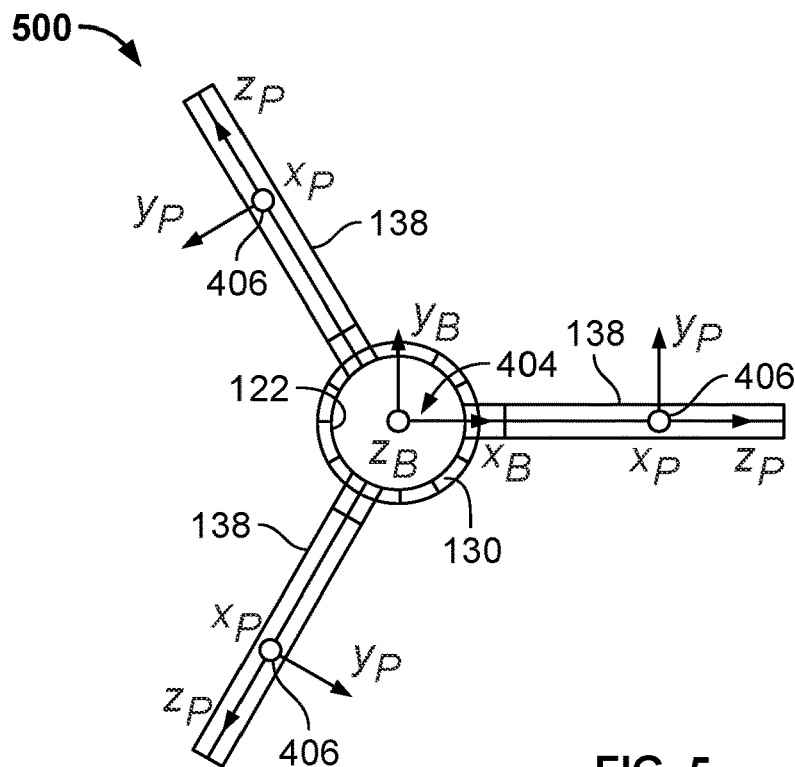
FIG. 5 illustrates a schematic view cross-section of a cased, deviated wellbore that includes perforation tunnels with an overlaid perforation coordinate system at each perforation tunnel according to the present disclosure.

For example, FIG. 5 illustrates a schematic isometric view cross-section 500 of wellbore 104 that includes perforation tunnels with an overlaid perforation coordinate system 406 at each perforation tunnel 138. As shown in cross-section 500, the perforation coordinate system 406 for different phase angles of perforation tunnels 138 can be rotated, for example, by: (1) rotating perforation phase angle $\alpha_{y,B}=\pi/2$ about the $y_B$-axis of the wellbore coordinate system 404; and (2) rotation of phase angle $\alpha_{z,B}$ about the $z_B$-axis of the wellbore coordinate system 404. In some aspects, for clustered perforations with a known perforation phase angle, the rotation matrix from wellbore coordinate system 404 $(x_B y_B z_B)$ to the perforation coordinate system 406 $(x_P y_P z_P)$ can be sequentially obtained by:

$$R_{B\to P}(\alpha_{z,B},\alpha_{y,B})=R_{B\to P}^1 R_{z,B}(\alpha_{z,B})=\begin{pmatrix}0 & 0 & -1\\ \sin\alpha_{z,B} & \cos\alpha_{z,B} & 0\\ \cos\alpha_{z,B} & \sin\alpha_{z,B} & 0\end{pmatrix}. \tag{22}$$

In Eq. 22, $\alpha_{z,B}$ is the perforation phase angle rotating about the wellbore axis-z, which ranges from 0° to 360° and starts from the highest point of a wellbore cross section. Thus, at the culmination of step 206, the in-situ stresses are transformed from the wellbore coordinate system to a perforation coordinate system.

Method 200 may continue at step 208, which includes determining one or more stresses (for example, a stress state) on a wellbore-perforation interface from the in-situ stresses (for example, and other contributed components) in the perforation coordinate system. For example, for wellbore 104, bottom hole pressure may act on the perforation tunnels 138 through two ways: (1) downhole pressure may be partially and radially transferred to the subterranean formation 118 through the casing 122-cement 130 layer(s) and eventually pressurize the formation 118, which induces stresses around the borehole-perforation interface; and (2) injecting fluid flows into the perforation tunnel 138 from the casing 122 and pressurizing the perforation wall directly.

Figure 6:
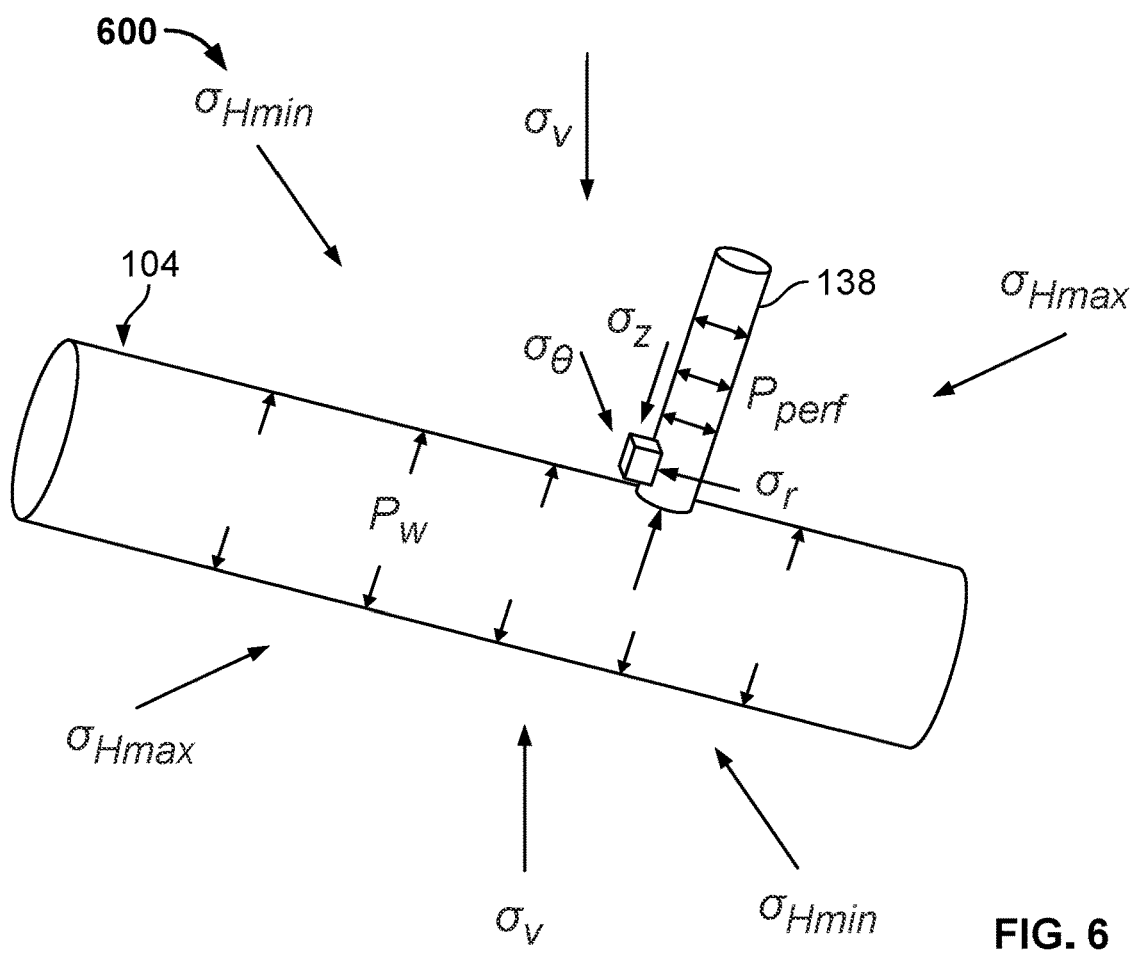
FIG. 6 illustrates a schematic isometric view of a portion of a wellbore with a perforation tunnel and loading cases according to the present disclosure.
Figure 7:
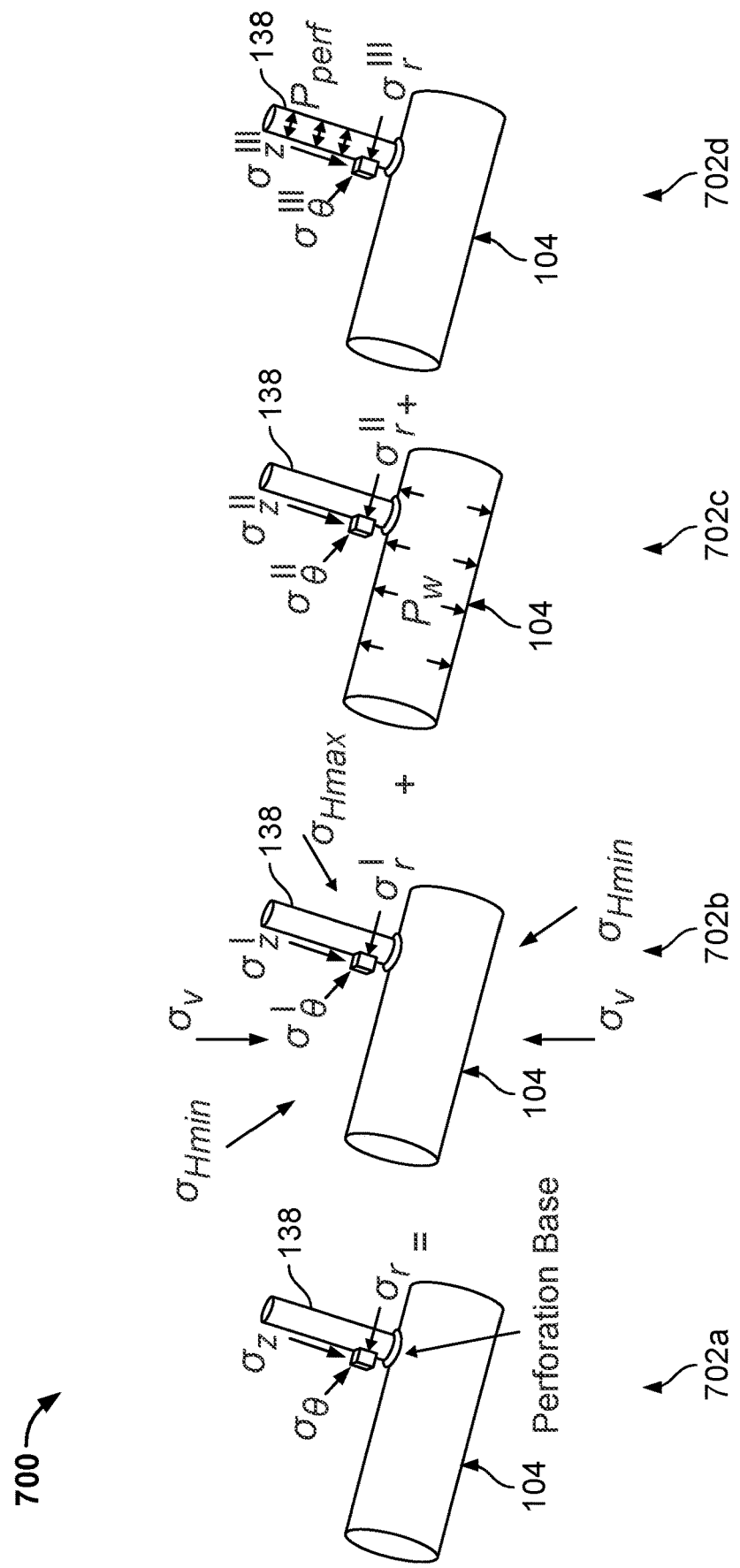
FIG. 7 illustrates an equation illustrated by a series of schematic isometric views of a portion of a wellbore with a perforation tunnel and particular acting pressures used to calculate a total effective stress through stress superposition according to the present disclosure.

In some aspects of the computational framework of method 200 (and step 208), the deformation is limited to linear elasticity. Thus, the total stresses can be summed up once the corresponding stresses induced by each load are calculated. For example, FIG. 6 illustrates a schematic isometric view 600 of a portion of the wellbore 104 with a particular perforation tunnel 138 and particular stresses and acting pressures. More specifically, view 600 shows the pressure loads that may be included to estimate the induced stresses around the wellbore-perforation interface. The induced stresses are also shown in FIG. 7, which illustrates an equation illustrated by a series 700 of schematic isometric views (702a, 702b, 702c, 702d) of a portion of wellbore 104 with a particular perforation tunnel 138 and particular stresses and pressures used to calculate a total effective stress through stress superposition. First, the stresses around the perforation tunnel 138 are induced by the far-field in-situ stress tensor (702b). Second, the borehole bottom hole pressure $P_w$ can be partially and radially transferred to the rock of the subterranean formation 118 through the casing 122 and cement 130, which generates additional stresses over the wellbore-perforation interface (702c). Third, the pressure $P_{perf}$ inside the perforation tunnel 138 induces stresses around the perforation tunnel 138, which may be a driving force to counter the combining stresses by the first and second parts and initiate a longitudinal fracture along the perforation tunnel 138 (702d).

In some aspects, the fluid pressure inside the perforation tunnel 138 might be different from the bottom hole pressure $P_w$ inside the casing 122 if the perforation friction is not negligible. The resulting induced stresses by these loads are denoted by superscript as $\sigma^I$, $\sigma^{II}$, and $\sigma^{III}$, respectively, which are shown in FIG. 7. From a mechanics point of view, the breakdown pressure of a perforation is a three dimensional mechanics problem and may be difficult to obtain a closed form analytical solution. Thus, in some aspects, the computational framework of method 200 may take a similar approximation of plane strain condition (satisfying the Kirsch equation) for the perforation tunnel 138. This approximation is feasible, because a ratio of perforation length to perforation diameter (L/D) is generally large in a real world example.

The breakdown pressure may be estimated based on the stress state at the perforation base, which is at the wellbore-perforation interface (for example, where the perforation 138 meets the wellbore 104) as marked in FIG. 7. The breakdown pressure refers to the bottom hole pressure $P_w$, whenever the hoop stress around the perforation base exceeds the tensile strength T of the rock of the subterranean formation 118. Based on the principle of stress superposition as shown in FIG. 7, the total effective stresses (702a) with respect to the perforation coordinate system are induced by the three parts as follows:

$$\sigma^P = \sigma^{P,I} + \sigma^{P,II} + \sigma^{P,III} \tag{23}.$$

In Eq. 23, the superscript P refers to the perforation coordinate system 406 and superscripts I, II, III refer to the three loading cases (702b, 702c, 702d). The far field in-situ stress tensor $\sigma^{P,I}$ around the perforation base in the perforation coordinate system 406 $(x_P y_P z_P)$ is obtained as follows:

$$\sigma^{P,I}=R_{B\to P}(\alpha_{z,B},\alpha_{y,B})\sigma^{B,I}R_{B\to P}^T(\alpha_{z,B},\alpha_{y,B})=\begin{pmatrix}\sigma_{xx}^{P,I} & \tau_{xy}^{P,I} & \tau_{xz}^{P,I}\\ \tau_{yx}^{P,I} & \sigma_{yy}^{P,I} & \tau_{yz}^{P,I}\\ \tau_{zx}^{P,I} & \tau_{zy}^{P,I} & \sigma_{zz}^{P,I}\end{pmatrix}. \tag{24}$$

Due to the lengthy expressions for the stress components, the exact analytical expressions are not provided here either and will be directly calculated in computer implementation. Based on Eq. 22, the far-field in-situ stresses in the perforation coordinate system can be expressed in terms of stress tensor $\sigma^B$ as follows $$\begin{cases} \sigma_{xx}^{P,I} = \sigma_{zz}^{B,I} \\ \sigma_{yy}^{P,I} = S_{\alpha_{z,B}}^2 \sigma_{xx}^{B,I} + C_{\alpha_{z,B}}^2 \sigma_{yy}^{B,I} + 2C_{\alpha_{z,B}} S_{\alpha_{z,B}} \tau_{xy}^{B,I} \\ \sigma_{zz}^{P,I} = C_{\alpha_{z,B}}^2 \sigma_{xx}^{B,I} + S_{\alpha_{z,B}}^2 \sigma_{yy}^{B,I} + 2C_{\alpha_{z,B}} S_{\alpha_{z,B}} \tau_{xy}^{B,I} \\ \tau_{xy}^{P,I} = -S_{\alpha_{z,B}} \tau_{xz}^{B,I} - C_{\alpha_{z,B}} \tau_{yz}^{B,I} \\ \tau_{yz}^{P,I} = S_{\alpha_{z,B}} C_{\alpha_{z,B}} (\sigma_{xx}^{B,I} + \sigma_{yy}^{B,I}) + \tau_{xy}^{B,I} \\ \tau_{zx}^{P,I} = -C_{\alpha_{z,B}} \tau_{xz}^{B,I} - S_{\alpha_{z,B}} \tau_{yz}^{B,I} \end{cases} \quad (25)$$

In Eq. 25, $C_{\alpha_{z,B}} = \cos \alpha_{z,B}$, $S_{\alpha_{z,B}} = \sin \alpha_{z,B}$.

Figure 8:
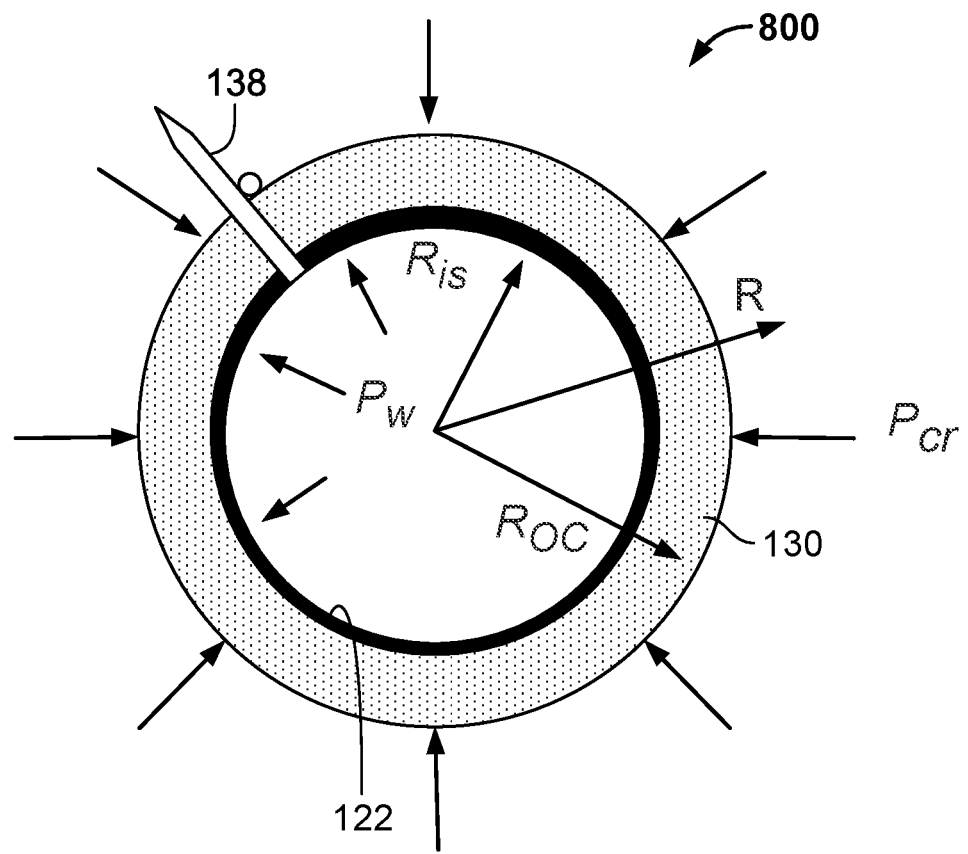
FIG. 8 illustrates a schematic view cross-section of a cased, deviated wellbore with casing and cement and particular pressures according to the present disclosure.
Figure 9:
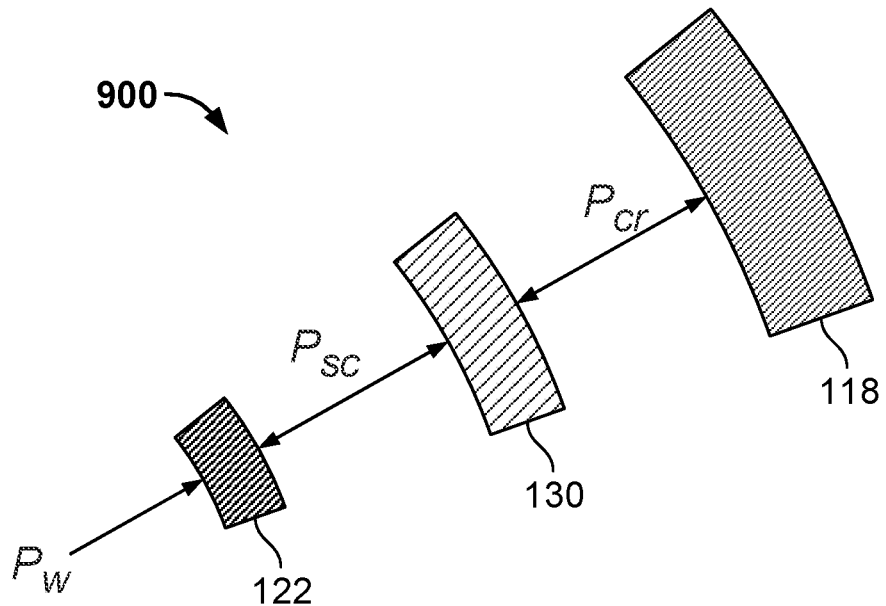
FIG. 9 illustrates an exploded schematic view of a radial section of a cased, deviated wellbore with casing and cement and particular pressures according to the present disclosure.

In some aspects, step 208 may also include taking into account the impacts of the casing 122 and the cement 130 on the formation breakdown pressure. For example, as opposed to an open hole completion in which a downhole pressure will directly act on the rock of the subterranean formation, for a cased wellbore such as the wellbore 104, the bottom hole pressure $P_w$ inside the casing 122 can be partially and radially transferred to the rock of the subterranean formation 119 through the casing 122 and the cement 130, which generate additional stresses over the wellbore-perforation interface. For example, FIGS. 8-9 illustrate these additional stresses. FIG. 8 illustrates a schematic top view cross-section 800 of the wellbore 104 with casing 122 and cement 130 and the additional stresses, which is dependent on the magnitude of $P_{cr}$ and related to the casing-cement-formation interaction. FIG. 9 illustrates an exploded schematic view 900 of a radial section of wellbore 104 with casing 122 and cement 130 and the additional pressure.

As shown in these figures, $R_{is}$ represents the casing inside radius, $R_{oc}$ represents the cement outer radius, wellbore radius $R_w = R_{oc}$, fluid pressure $P_w$ is inside the casing 122, casing-cement interface pressure is $P_{sc}$, and $P_{cr}$ is pressure between the cement 130 and the rock of subterranean formation 118. In some aspects, the casing-cement-rock are assumed to be fully bonded without slip in this computational framework of method 200.

The casing-cement-rock interaction results in the final interface pressure acting on the subterranean formation 118, which should be less than inside casing pressure, $P_w$. In order to estimate this part induced stresses, the computational framework of method 200 establishes an analytical elastic solution for calculating the cement-formation interface pressure, $P_{cr}$. For example, the internal pressure loading of the casing 122 can be considered as an axisymmetric plane strain problem even for a deviated well trajectory such as wellbore 104. After removing the in-situ stresses effect, the analytical solution for the cement-formation interface pressure $P_{cr}$ can be obtained as follows:

$$P_{cr} = \frac{-C_{21} b_1 P_W}{C_{11} C_{22} - C_{21} C_{12}} = \beta_{cr} P_w, \quad (26)$$

In Eq. 26:

$$C_{11} = \frac{(1+\mu_s)[(1-2\mu_s)R_{os}^2 + R_{is}^2]R_{os}}{R_{os}^2 - R_{is}^2} + \frac{E_s(1+\mu_s)[(1-2\mu_c)R_{ic}^2 + R_{oc}^2]R_{ic}}{E_c(R_{oc}^2 - R_{ic}^2)}, \quad (27)$$

$$C_{12} = -\frac{2E_s(1-\mu_c^2)R_{oc}^2 R_{ic}}{E_c(R_{oc}^2 - R_{ic}^2)}, \quad (28)$$

$$C_{21} = -\frac{2E_f(1-\mu_c^2)R_{ic}^2 R_{oc}}{E_c(R_{oc}^2 - R_{ic}^2)}, \quad (29)$$

$$C_{22} = \frac{E_f(1+\mu_c)[(1-2\mu_c)R_{oc}^2 + R_{ic}^2]R_{oc}}{E_c(R_{oc}^2 - R_{ic}^2)} + (1+\mu_f)R_w, \quad (30)$$

$$b_1 = \frac{2(1-\mu_s^2)R_{is}^2 R_{os}}{(R_{oc}^2 - R_{ic}^2)}, \quad (31)$$

$$\beta_{cr} = \frac{-C_{21} b_1}{C_{11} C_{22} - C_{21} C_{12}}, \quad (32)$$

After obtaining the magnitude of pressure acting on the rock transferred through the casing 122 and cement 130, it can be approximately assumed that an axisymmetric plane strain condition exists along the wellbore axis direction under the load of interface pressure. Thus, the stress distribution near the wellbore 104 can be given as follows:

$$\begin{cases} \sigma_R^{B,II} = P_{cr} \frac{R_{oc}^2}{R^2} \\ \sigma_\theta^{B,II} = -P_{cr} \frac{R_{oc}^2}{R^2} \end{cases} \quad (33)$$

Figure 10:
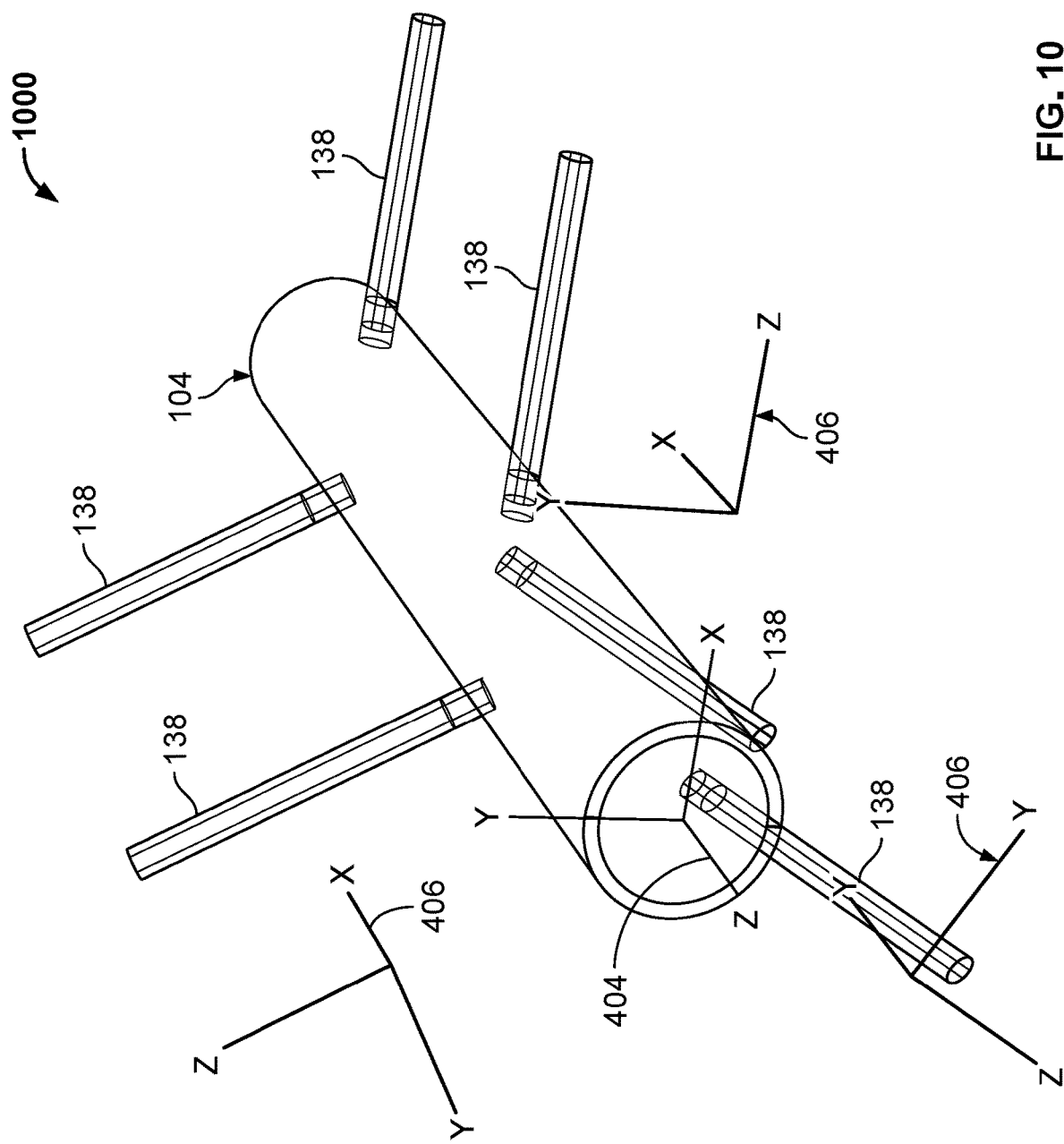
FIG. 10 illustrates an isometric view of a wellbore and perforation tunnels with overlaid coordinate systems for the wellbore and perforation tunnels according to the present disclosure.

The above radial and circumferential stresses are constant regardless of angle θ about the axis of wellbore 104. This is convenient for applying stress superposition to calculate the total breakdown pressure when projecting them onto the perforation coordinate systems 406 (for example, as shown in FIGS. 5, 8, 9). In some aspects, the stress components of $\sigma_R^{B,II}$, $\sigma_\theta^{B,II}$ and $\sigma_Z^{B,II}$ are calculated with respect to the wellbore 104, which has a different orientation (and coordinate system 404) from the perforation coordinate system 406 ($x_P y_P z_P$) as shown in FIG. 10 (and FIG. 4). For example, FIG. 10 illustrates an isometric view 1000 of the wellbore 104 (for example, horizontal portion 110) with perforation tunnels 138 and overlaid coordinate systems for the wellbore 104 and perforation tunnels 138.

As shown in FIG. 10 (and FIG. 4), in the perforation coordinate system 406 ($x_P y_P z_P$), $\sigma_\theta^{B,II}$ aligns in the same direction of the $y_P$-axis, $\sigma_Z^{B,II}$ aligns in the direction of the $x_P$-axis, and $\sigma_R^{B,II}$ aligns in the direction of $z_P$-axis. Based on the orientations of the coordinate systems attached to wellbore and perforations as shown in these figures, it leads to the following relationships:

$$\sigma_{xx}^{P,II} = \sigma_{zz}^{B,II} = 0, \quad (34)$$

$$\sigma_{yy}^{P,II} = \sigma_{\theta\theta}^{B,II} = -P_{cr} \frac{R_{oc}^2}{R^2} = -P_{cr} \quad (35)$$

$$\sigma_{zz}^{P,II} = \sigma_{rr}^{B,II} = P_{cr} \frac{R_{oc}^2}{R^2} = P_{cr} \quad (36)$$

Calculation of $\sigma^{III}$ stress tensor around the perforation tunnel 138 (for example at the perforation interface) may be related to the fluid pressure inside the perforation tunnel 138. For each perforation tunnel 138, it can be reasonably considered as an axisymmetric loading case and with a plane strain condition along the perforation axis, $z_p$. Therefore, the expression is the same to Eq. 33, but the radial direction should be in the perforation radial direction (and it is also differentiated by lower case r):

$$\sigma_r^{P,III} = P_{perf} \frac{r_p^2}{r^2} \text{ and } \sigma_\theta^{P,III} = -P_{perf} \frac{r_p^2}{r^2}. \quad (37)$$

To calculate the fluid pressure acting on the perforation tunnel 138, the pressure loss across the perforation entry is accounted for, which may be important for hydraulic fracturing pump schedule design. For example, a sharp-edge orifice equation may be used to estimate the pressure drop as follows:

$$\Delta P_{perf} = \frac{0.2369\rho}{d^4 C_d^2}\left(\frac{Q}{N}\right)^2, \quad (38)$$

where ρ is fluid density in lb/gal; d is the initial perforation diameter in inches; $C_d$ is the perforation coefficient of discharge; Q is the flow rate in bbl/min; and N is the number of perforation tunnels 138. The total fluid pressure inside the perforation tunnel may be expressed as:

$$P_{perf} = P_w - \Delta P_{perf} = \beta_{perf} P_w, \quad (39)$$

$$\beta_{perf} = 1 - \frac{0.2369\rho}{d^4 C_d^2}\left(\frac{Q}{N}\right)^2, \quad (40)$$

In Eq. 39, $\beta_{perf} \in [0,1]$ represents the fraction of wellbore pressure effectively transferred to a perforation hole and that acts on the perforation wall to counter the induced hoop stresses by in-situ stresses and $P_{cr}$, and initiate the hydraulic fracture. Before rock breakdown and fracture initiation, $P_{perf}$ can be assumed to be equal to wellbore pressure, $P_w$, if friction loss is negligible. Otherwise, the internal pressure acting on a perforation wall may be adjusted based on the perforation quality. For example, perforation quality (for example, accounted for by $\beta_{perf}$) can significantly impact the breakdown issue, which may be accounted for calculating breakdown pressure.

Figure 11:
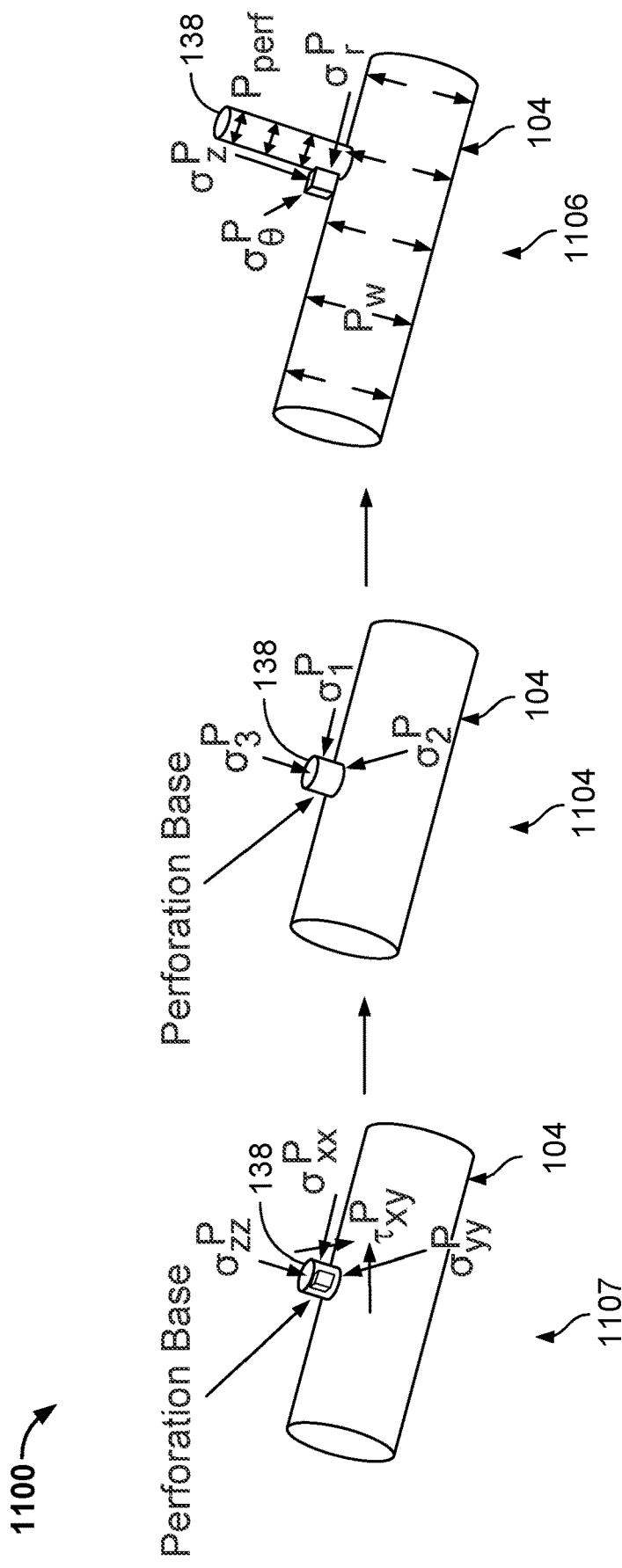
FIG. 11 illustrates a series of schematic isometric views of a portion of a wellbore with a perforation tunnel and particular stresses used to calculate a hoop stress around the perforation tunnel according to the present disclosure.

Method 200 may continue at step 210, which includes calculating one or more hoop stresses at a perforation tunnel wall of the perforation tunnel from the determined stresses on the wellbore-perforation interface. For example, in some aspects, the determined stresses from step 208 are used to calculate the hoop stresses at the wellbore-perforation interface. For instance, FIG. 11 illustrates a series 1100 of schematic isometric views (1102, 1104, 1106) of a portion of the wellbore with a particular perforation tunnel 138 and particular stresses used to calculate a hoop stress around the perforation tunnel 138. View 1102 shows a first sub-step of the step 210, which includes adding the induced stresses of loading cases I and II (702b and 702c) together. Limiting $R = R_{oc} = R_w$ results in the stresses within the perforation-wellbore interface as follows:

$$\begin{cases} \sigma_{xx}^{P,I-II} = \sigma_{xx}^{P,I} + \sigma_{xx}^{B,II} = \sigma_{zz}^{B,I} + \sigma_{zz}^{B,II} = \sigma_{zz}^{B,I} \\ \sigma_{yy}^{P,I-II} = \sigma_{yy}^{P,I} + \sigma_{yy}^{P,II} = S_{\alpha_{z,B}}^2 \sigma_{xx}^{B,I} + C_{\alpha_{z,B}}^2 \sigma_{yy}^{B,I} + 2C_{\alpha_{z,B}} S_{\alpha_{z,B}} \tau_{xy}^{B,I} - P_{cr} \\ \sigma_{zz}^{P,I-II} = \sigma_{zz}^{P,I} + \sigma_{rr}^{P,II} = C_{\alpha_{z,B}}^2 \sigma_{xx}^{B,I} + S_{\alpha_{z,B}}^2 \sigma_{yy}^{B,I} + 2C_{\alpha_{z,B}} S_{\alpha_{z,B}} \tau_{xy}^{B,I} + P_{cr} \\ \tau_{xy}^{P,I-II} = -S_{\alpha_{z,B}} \tau_{xz}^{B,I} - C_{\alpha_{z,B}} \tau_{yz}^{B,I} \\ \tau_{yz}^{P,I-II} = S_{\alpha_{z,B}} C_{\alpha_{z,B}} (\sigma_{xx}^{B,I} + \sigma_{yy}^{B,I}) + \tau_{xy}^{B,I} \\ \tau_{zx}^{P,I-II} = -C_{\alpha_{z,B}} \tau_{xz}^{B,I} - S_{\alpha_{z,B}} \tau_{yz}^{B,I} \end{cases} \quad (41)$$

For the purpose of mathematical symbolic simplification and computer implementation, Eq. 41 can be further simplified as:

$$\begin{cases} \sigma_{xx}^{P,I-II} = S_{xx}^0 \\ \sigma_{yy}^{P,I-II} = S_{yy}^0 - P_{cr} = S_{yy}^0 - \beta_{cr} P_w \\ \sigma_{zz}^{P,I-II} = S_{zz}^0 P_{cr} = S_{zz}^0 + \beta_{cr} P_w \\ \tau_{xy}^{P,I-II} = T_{xy}^0 \\ \tau_{yz}^{P,I-II} = T_{yz}^0 \\ \tau_{zx}^{P,I-II} = T_{zx}^0 \end{cases} \quad (42)$$

$$\begin{cases} S_{xx}^0 = \sigma_{zz}^{B,I} \\ S_{yy}^0 = S_{\alpha_{z,B}}^2 \sigma_{xx}^{B,I} + C_{\alpha_{z,B}}^2 \sigma_{yy}^{B,I} + 2C_{\alpha_{z,B}} S_{\alpha_{z,B}} \tau_{xy}^{B,I} \\ S_{zz}^0 = C_{\alpha_{z,B}}^2 \sigma_{xx}^{B,I} + S_{\alpha_{z,B}}^2 \sigma_{yy}^{B,I} + 2C_{\alpha_{z,B}} S_{\alpha_{z,B}} \tau_{xy}^{B,I} \\ T_{xy}^0 = -S_{\alpha_{z,B}} \tau_{xz}^{B,I} - C_{\alpha_{z,B}} \tau_{yz}^{B,I} \\ T_{yz}^0 = S_{\alpha_{z,B}} C_{\alpha_{z,B}} (\sigma_{xx}^{B,I} + \sigma_{yy}^{B,I}) + \tau_{xy}^{B,I} \\ T_{zx}^0 = -C_{\alpha_{z,B}} \tau_{xz}^{B,I} - S_{\alpha_{z,B}} \tau_{yz}^{B,I} \end{cases} \quad (43)$$

Eq. 43 gives the stresses acting on the wellbore-perforation interface (as shown in FIG. 7), which are induced by the far field in-situ stresses and interface pressure $P_{cr}$.

View 1104 shows a second sub-step of the step 210, which includes calculating the local maximum and minimum stresses in the perforation base due to loading cases I and II. The local principal stresses in the perforation coordinate system plane, $x_P y_P$, on the wellbore-perforation interface that surrounds the perforation tunnel can be given by:

$$\begin{cases} \sigma_{max}^P = \frac{\sigma_{xx}^{P,I-II} + \sigma_{yy}^{P,I-II}}{2} + \sqrt{\left(\frac{\sigma_{xx}^{P,I-II} - \sigma_{yy}^{P,I-II}}{2}\right)^2 + (\tau_{xy}^{P,I-II})^2} \\ \sigma_{min}^P = \frac{\sigma_{xx}^{P,I-II} + \sigma_{yy}^{P,I-II}}{2} - \sqrt{\left(\frac{\sigma_{xx}^{P,I-II} - \sigma_{yy}^{P,I-II}}{2}\right)^2 + (\tau_{xy}^{P,I-II})^2} \end{cases} \quad (44)$$

or $$\sigma_{max}^P = \frac{S_{xx}^0 + S_{yy}^0 - P_{cr}}{2} + \sqrt{\left(\frac{S_{xx}^0 - S_{yy}^0 + P_{cr}}{2}\right)^2 + (T_{xy}^0)^2}, \quad (45)$$

$$\sigma_{min}^P = \frac{S_{xx}^0 + S_{yy}^0 - P_{cr}}{2} - \sqrt{\left(\frac{S_{xx}^0 - S_{yy}^0 + P_{cr}}{2}\right)^2 + (T_{xy}^0)^2}. \quad (46)$$

View 1106 shows a third sub-step of the step 210, which includes calculating the hoop stress around the perforation tunnel 138. Following the conditions satisfying the Eqs. 7 and 9, a plane strain condition along the perforation axis, $Z_P$, can be assumed. Therefore the hoop stress with respect to the perforation tunnel 138 can be obtained as follows:

$$\sigma_\theta = (S_{xx}^0 + S_{yy}^0 - P_{cr}) - 2\cos 2\theta_p \sqrt{(S_{xx}^0 - S_{yy}^0 + P_{cr})^2 + 4T_{xy}^{0\,2}} - (P_{perf} - P_0) \quad (47).$$

Eq. 47 adds the induced stress by $P_{cr}$. Since, in some aspects, the rock breakdown due to the fracturing fluid likely initiates at the perforation base along the direction of $\sigma_{max}^P$ with $\theta_p=0$, this leads to the hoop stress as follows:

$$\sigma_\theta = (S_{xx}^0 + S_{yy}^0 - P_{cr}) - 2\sqrt{(S_{xx}^0 - S_{yy}^0 + P_{cr})^2 + 4(T_{xy}^0)^2} - (P_{perf} - P_0) \quad (48).$$

The hydraulic fracture generally initiates when the hoop stress around the perforation tunnel 138 exceeds the rock tensile strength, T. Based on the stress sign convention, it follows:

$$(S_{xx}^0 + S_{yy}^0 - P_{cr}) - 2\sqrt{(S_{xx}^0 - S_{yy}^0 + P_{cr})^2 + 4(T_{xy}^0)^2} - (P_{perf} - P_0) = -T \quad (48),$$

$$a = S_{xx}^0 + S_{yy}^0 \quad (50),$$

$$b = S_{xx}^0 - S_{yy}^0 \quad (51).$$

Eq. 49 can be simplified as:

$$a + T + P_0 - (P_{cr} + P_{perf}) - 2\sqrt{(b + P_{cr})^2 + 4(T_{xy}^0)^2} = 0 \quad (52),$$

with:

$$c = a + T + P_0 \quad (53),$$

$$P_{perf} = \beta_{perf} P_w \quad (54), \text{ and}$$

$$P_{cr} = \beta_{cr} P_w \quad (55).$$

Method 200 may continue at step 212, which includes determining a breakdown pressure for the subterranean formation based at least in part on the calculated one or more hoop stresses. In some aspects, step 212 includes solving a non-linear equation (by the computational framework) to determine the breakdown pressure. For example, based on the calculated hoop stresses, the breakdown pressure, $P_w$, of the subterranean formation 118 into which a cased, deviated wellbore (wellbore 104) is formed may be calculated according to:

$$(\beta_{perf}^2 + 2\beta_{cr}\beta_{perf} - 3\beta_{cr}^2)P_w^2 - (2c\beta_{cr} + 8b\beta_{cr} + 2c\beta_{perf})P_w + c^2 - 4b^2 - 16(T_{xy}^0)^2 = 0 \quad (55).$$

The result of this calculation of $P_w$ should be a positive number. As shown, Eq. 55 is a quadratic equation and the breakdown pressure may not be given by an explicit expression (as is the case for conventional, vertical, open hole wellbores), namely, because of the casing-cement interaction and estimating the interface pressure, $P_{cr}$, with the computational framework of method 200.

Method 200 may continue at step 214, which includes generating data that represents the determined breakdown pressure to present on a graphical user interface. In some aspects, such generated data represents the determined breakdown pressure for perforation clusters. For example, the calculated breakdown pressure, $P_w$, may be presented through the control system 146 to an operator, such as a hydraulic fracturing operator, in order to design a hydraulic fracturing operation.

An example output from the computational framework is shown in FIGS. 12A-12C, which illustrate tables 1200, 1210, and 1220, respectively. Tables 1200, 1210, and 1220 show output data from the computational framework of method 200 for an example cased, deviated wellbore with perforation clusters. For example, Table 1200 shows the well trajectory, inner diameter (ID) and outer diameter (OD) of casing and cement, and the mechanical properties (such as Young's modulus (YM) and Poisson's ratio (PR)) of the casing, the cement, and the formation (all be measured depth (MD)). Table 1210 lists the predicted results of breakdown pressure corresponding to different phase angles (as shown, 0, 60, 120, 180, 240, 300, and 360) at measured depths without considering the effect of the casing and the cement. Table 1220 lists the numerical test results of breakdown pressure corresponding to different phase angles (as shown, 0, 60, 120, 180, 240, 300, and 360) at measured depths with considering the effect of the casing and the cement. The numerical results show that the breakdown pressures determined by the computational framework of method 200 when taking into account the casing effect will be greater than the breakdown pressures being determined without considering the effect of the casing-cement. The results of tables 1210 and 1220 suggest that wellbore casing may make the formation breakdown more difficult for a horizontal well based on the magnitude of the required breakdown pressures. Unlike open hole hydraulic fracturing, cased hole and clustered perforation hydraulic fracturing can effectively direct fluids to initiate hydraulic fractures from perforation clusters, which is good for generating transverse fractures.

Figure 13:
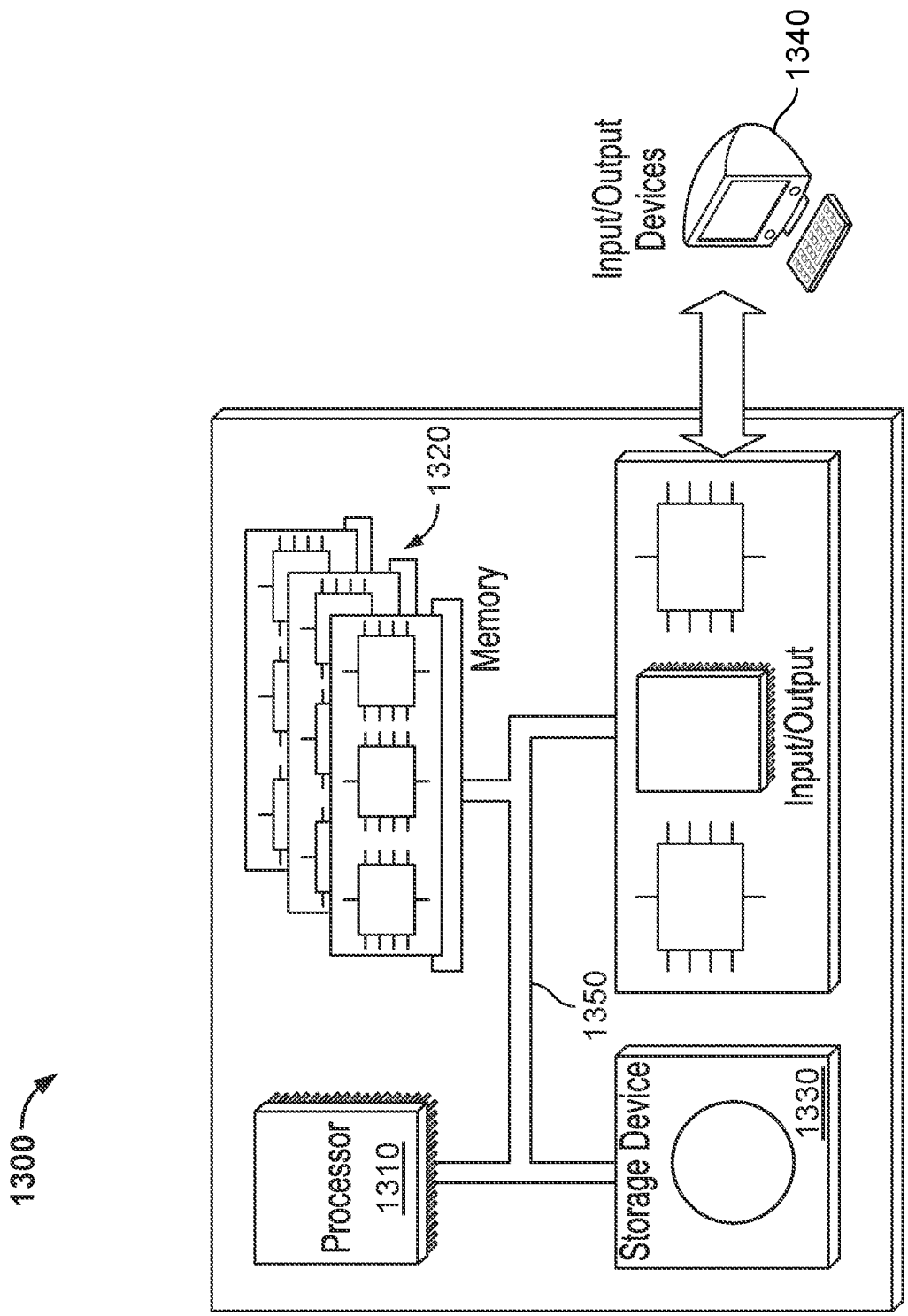
FIG. 13 is a schematic illustration of an example controller (or control system) for determining a subterranean formation breakdown pressure according to the present disclosure.

FIG. 13 is a schematic illustration of an example controller 1300 (or control system) for determining a subterranean formation breakdown pressure according to the present disclosure. For example, the controller 1300 may include or be part of the control system 146 shown in FIG. 1. The controller 1300 is intended to include various forms of digital computers, such as printed circuit boards (PCB), processors, digital circuitry, or otherwise parts of a system for determining a subterranean formation breakdown pressure. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 1300 includes a processor 1310, a memory 1320, a storage device 1330, and an input/output device 1340 (for displays, input devices, example, sensors, valves, pumps). Each of the components 1310, 1320, 1330, and 1340 are interconnected using a system bus 1350. The processor 1310 is capable of processing instructions for execution within the controller 1300. The processor may be designed using any of a number of architectures. For example, the processor 1310 may be a CISC (Complex Instruction Set Computers) processor, a RISC (Reduced Instruction Set Computer) processor, or a MISC (Minimal Instruction Set Computer) processor.

In one implementation, the processor 1310 is a single-threaded processor. In another implementation, the processor 1310 is a multi-threaded processor. The processor 1310 is capable of processing instructions stored in the memory 1320 or on the storage device 1330 to display graphical information for a user interface on the input/output device 1340.

The memory 1320 stores information within the controller 1300. In one implementation, the memory 1320 is a computer-readable medium. In one implementation, the memory 1320 is a volatile memory unit. In another implementation, the memory 1320 is a non-volatile memory unit.

The storage device 1330 is capable of providing mass storage for the controller 1300. In one implementation, the storage device 1330 is a computer-readable medium. In various different implementations, the storage device 1330 may be a floppy disk device, a hard disk device, an optical disk device, or a tape device.

The input/output device 1340 provides input/output operations for the controller 1300. In one implementation, the input/output device 1340 includes a keyboard and/or pointing device. In another implementation, the input/output device 1340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A computer-implemented method for determining a breakdown pressure of a subterranean formation, the method comprising:

identifying, with one or more hardware processors, in-situ stresses for a portion of a wellbore formed from a terranean surface into a subterranean formation;

transforming, with the one or more hardware processors, the in-situ stresses from a global coordinate system to a wellbore coordinate system of a deviated portion of the wellbore that comprises at least one perforation tunnel for a hydraulic fracturing treatment;

transforming, with one or more hardware processors, the in-situ stresses from the wellbore coordinate system to a perforation coordinate system through at least one rotation matrix;

determining, with one or more hardware processors, one or more stresses at a wellbore-perforation interface of the perforation tunnel from the in-situ stresses in the perforation coordinate system;

calculating, with one or more hardware processors, one or more hoop stresses at a perforation tunnel wall of the perforation tunnel from the determined one or more stresses on the wellbore-perforation interface; and determining, with one or more hardware processors, a breakdown pressure for the subterranean formation based at least in part on the calculated one or more hoop stresses.

2. The computer-implemented method of claim 1, wherein the global coordinate system comprises an x-axis directed toward north, a y-axis directed toward east, and a z-axis directed vertically downwards from the terranean surface, and the wellbore coordinate system is defined by a measured depth, a wellbore deviation, and a wellbore azimuth, and transforming the in-situ stresses from the global coordinate system to the wellbore coordinate system comprises:

rotating the wellbore deviation about the y-axis; and
rotating the wellbore azimuth about the z-axis.

3. The computer-implemented method of claim 1, wherein transforming the in-situ stresses from the wellbore coordinate system to the perforation coordinate system through the at least one rotation matrix comprises:

rotating a first perforation phase angle about a first axis of the wellbore coordinate system; and
rotating a second perforation phase angle about a second axis of the wellbore coordinate system.

4. The computer-implemented method of claim 1, wherein determining one or more stresses at the wellbore-perforation interface of the perforation tunnel from the in-situ stresses in the perforation coordinate system comprises:

determining a far-field in-situ stress tensor that acts on a wellbore-perforation interface between the deviated portion of the wellbore and the perforation tunnel wall;
determining a bottom hole pressure that acts on the subterranean formation adjacent the perforation tunnel wall from a fracturing liquid;
determining a pressure within the at least one perforation tunnel that induces stress on the perforation tunnel wall; and
calculating the one or more stresses on the perforation tunnel wall from the determinations of the far-field in-situ stress tensor, the bottom hole pressure, and the pressure within the at least one perforation tunnel.

5. The computer-implemented method of claim 4, wherein determining the bottom hole pressure that acts on the subterranean formation adjacent the perforation tunnel wall from the fracturing liquid comprises determining a pressure at an interface of the subterranean formation and a cement layer that binds a wellbore casing to the subterranean formation based on a pressure of the fracturing liquid.

6. The computer-implemented method of claim 4, wherein determining the pressure within the at least one perforation tunnel that induces stress on the perforation tunnel wall comprises determining the pressure within the at least one perforation tunnel by subtracting a perforation pressure loss from the bottom hole pressure.

7. The computer-implemented method of claim 4, wherein calculating one or more hoop stresses at the perforation tunnel wall of the perforation tunnel from the determined one or more stresses on the wellbore-perforation interface comprises:

summing induced stresses based on the far-field in-situ stress tensor and the bottom hole pressure;
calculating local maximum and minimum stresses at the wellbore-perforation interface based on the far-field in-situ stress tensor and the bottom hole pressure; and
calculating the one or more hoop stresses around the at least one perforation tunnel.

8. The computer-implemented method of claim 7, wherein determining the breakdown pressure for the subterranean formation based at least in part on the calculated one or more hoop stresses comprises solving for the breakdown pressure with a quadratic equation that comprises the one or more calculated hoop stresses, the bottom hole pressure, and a tensile strength of the subterranean formation.

9. The computer-implemented method of claim 1, further comprising:

generating, with the one or more hardware processors, data that comprises a graphic that represents the determined breakdown pressure for the subterranean formation; and
presenting the generated data through a graphical user interface (GUI).

10. A system, comprising:
one or more memory modules; and
one or more hardware processors communicably coupled to the one or more memory modules, the one or more hardware processors configured to execute instructions stored on the one or more memory modules to perform operations comprising:

identifying in-situ stresses for a portion of a wellbore formed from a terranean surface into a subterranean formation;
transforming the in-situ stresses from a global coordinate system to a wellbore coordinate system of a deviated portion of the wellbore that comprises at least one perforation tunnel for a hydraulic fracturing treatment;
transforming the in-situ stresses from the wellbore coordinate system to a perforation coordinate system through at least one rotation matrix;
determining one or more stresses at a wellbore-perforation interface of the perforation tunnel from the in-situ stresses in the perforation coordinate system;
calculating one or more hoop stresses at a perforation tunnel wall of the perforation tunnel from the determined one or more stresses on the wellbore-perforation interface; and
determining a breakdown pressure for the subterranean formation based at least in part on the calculated one or more hoop stresses.

11. The system of claim 10, wherein the global coordinate system comprises an x-axis directed toward north, a y-axis directed toward east, and a z-axis directed vertically downwards from the terranean surface, and the wellbore coordinate system is defined by a measured depth, a wellbore deviation, and a wellbore azimuth, and transforming the in-situ stresses from the global coordinate system to the wellbore coordinate system comprises:

rotating the wellbore deviation about the y-axis; and
rotating the wellbore azimuth about the z-axis.

12. The system of claim 10, wherein the operation of transforming the in-situ stresses from the wellbore coordinate system to the perforation coordinate system through the at least one rotation matrix comprises:

rotating a first perforation phase angle about a first axis of the wellbore coordinate system; and
rotating a second perforation phase angle about a second axis of the wellbore coordinate system.

13. The system of claim 10, wherein the operation of determining one or more stresses at the wellbore-perforation interface of the perforation tunnel from the in-situ stresses in the perforation coordinate system comprises:

determining a far-field in-situ stress tensor that acts on a wellbore-perforation interface between the deviated portion of the wellbore and the perforation tunnel wall;
determining a bottom hole pressure that acts on the subterranean formation adjacent the perforation tunnel wall from a fracturing liquid;
determining a pressure within the at least one perforation tunnel that induces stress on the perforation tunnel wall; and
calculating the one or more stresses on the perforation tunnel wall from the determinations of the far-field in-situ stress tensor, the bottom hole pressure, and the pressure within the at least one perforation tunnel.

14. The system of claim 13, wherein the operation of determining the bottom hole pressure that acts on the subterranean formation adjacent the perforation tunnel wall from the fracturing liquid comprises determining a pressure at an interface of the subterranean formation and a cement layer that binds a wellbore casing to the subterranean formation based on a pressure of the fracturing liquid.

15. The system of claim 14, wherein the operation of determining the pressure within the at least one perforation tunnel that induces stress on the perforation tunnel wall comprises determining the pressure within the at least one perforation tunnel by subtracting a perforation pressure loss from the bottom hole pressure.

16. The system of claim 13, wherein the operation of calculating one or more hoop stresses at the perforation tunnel wall of the perforation tunnel from the determined one or more stresses on the wellbore-perforation interface comprises:

summing induced stresses based on the far-field in-situ stress tensor and the bottom hole pressure;
calculating local maximum and minimum stresses at the wellbore-perforation interface based on the far-field in-situ stress tensor and the bottom hole pressure; and
calculating the one or more hoop stresses around the at least one perforation tunnel.

17. The system of claim 16, wherein the operation of determining the breakdown pressure for the subterranean formation based at least in part on the calculated one or more hoop stresses comprises solving for the breakdown pressure with a quadratic equation that comprises the one or more calculated hoop stresses, the bottom hole pressure, and a tensile strength of the subterranean formation.

18. The system of claim 10, further comprising a graphical user interface (GUI) communicably coupled to the one or more hardware processors, and the operations further comprise:

generating data that comprises a graphic that represents the determined breakdown pressure for the subterranean formation; and
presenting the generated data through the GUI.

19. An apparatus comprising a non-transitory, computer readable, storage medium that stores instructions that, when executed by at least one processor, cause the at least one processor to perform operations comprising:

identifying in-situ stresses for a portion of a wellbore formed from a terranean surface into a subterranean formation;
transforming the in-situ stresses from a global coordinate system to a wellbore coordinate system of a deviated portion of the wellbore that comprises at least one perforation tunnel for a hydraulic fracturing treatment;
transforming the in-situ stresses from the wellbore coordinate system to a perforation coordinate system through at least one rotation matrix;
determining one or more stresses at a wellbore-perforation interface of the perforation tunnel from the in-situ stresses in the perforation coordinate system;
calculating one or more hoop stresses at a perforation tunnel wall of the perforation tunnel from the determined one or more stresses on the wellbore-perforation interface; and
determining a breakdown pressure for the subterranean formation based at least in part on the calculated one or more hoop stresses.

20. The apparatus of claim 19, wherein the global coordinate system comprises an x-axis directed toward north, a y-axis directed toward east, and a z-axis directed vertically downwards from the terranean surface, and the wellbore coordinate system is defined by a measured depth, a wellbore deviation, and a wellbore azimuth, and transforming the in-situ stresses from the global coordinate system to the wellbore coordinate system comprises:

rotating the wellbore deviation about the y-axis; and
rotating the wellbore azimuth about the z-axis.

21. The apparatus of claim 19, wherein the operation of transforming the in-situ stresses from the wellbore coordinate system to the perforation coordinate system through the at least one rotation matrix comprises:

rotating a first perforation phase angle about a first axis of the wellbore coordinate system; and
rotating a second perforation phase angle about a second axis of the wellbore coordinate system.

22. The apparatus of claim 19, wherein the operation of determining one or more stresses at the wellbore-perforation interface of the perforation tunnel from the in-situ stresses in the perforation coordinate system comprises:

determining a far-field in-situ stress tensor that acts on a wellbore-perforation interface between the deviated portion of the wellbore and the perforation tunnel wall;
determining a bottom hole pressure that acts on the subterranean formation adjacent the perforation tunnel wall from a fracturing liquid;
determining a pressure within the at least one perforation tunnel that induces stress on the perforation tunnel wall; and
calculating the one or more stresses on the perforation tunnel wall from the determinations of the far-field in-situ stress tensor, the bottom hole pressure, and the pressure within the at least one perforation tunnel.

23. The apparatus of claim 22, wherein the operation of determining the bottom hole pressure that acts on the subterranean formation adjacent the perforation tunnel wall from the fracturing liquid comprises determining a pressure at an interface of the subterranean formation and a cement layer that binds a wellbore casing to the subterranean formation based on a pressure of the fracturing liquid.

24. The apparatus of claim 23, wherein the operation of determining the pressure within the at least one perforation tunnel that induces stress on the perforation tunnel wall comprises determining the pressure within the at least one perforation tunnel by subtracting a perforation pressure loss from the bottom hole pressure.

25. The apparatus of claim 22, wherein the operation of calculating one or more hoop stresses at the perforation tunnel wall of the perforation tunnel from the determined one or more stresses on the wellbore-perforation interface comprises:
  summing induced stresses based on the far-field in-situ stress tensor and the bottom hole pressure;
  calculating local maximum and minimum stresses at the wellbore-perforation interface based on the far-field in-situ stress tensor and the bottom hole pressure; and
  calculating the one or more hoop stresses around the at least one perforation tunnel.

26. The apparatus of claim 25, wherein the operation of determining the breakdown pressure for the subterranean formation based at least in part on the calculated one or more hoop stresses comprises solving for the breakdown pressure with a quadratic equation that comprises the one or more calculated hoop stresses, the bottom hole pressure, and a tensile strength of the subterranean formation.

27. The apparatus of claim 19, wherein the operations further comprise:
  generating data that comprises a graphic that represents the determined breakdown pressure for the subterranean formation; and
  presenting the generated data through a graphical user interface (GUI).

* * * * *